United States Patent
Zhao et al.

(10) Patent No.: US 12,033,513 B2
(45) Date of Patent: Jul. 9, 2024

(54) INTERNET OF THINGS (IOT) PLATOON COMMUNICATION METHOD

(71) Applicant: Huawei Cloud Computing Technologies Co., Ltd., Guizhou (CN)

(72) Inventors: Can Zhao, Shenzhen (CN); Bei Xu, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 716 days.

(21) Appl. No.: 17/141,446

(22) Filed: Jan. 5, 2021

(65) Prior Publication Data

US 2021/0125501 A1    Apr. 29, 2021

Related U.S. Application Data

(63) Continuation of application No. PCT/CN2019/094654, filed on Jul. 4, 2019.

(30) Foreign Application Priority Data

Jul. 6, 2018    (CN) .......................... 201810736940.5

(51) Int. Cl.
*G08G 1/00*    (2006.01)
*G05D 1/00*    (2006.01)
(Continued)

(52) U.S. Cl.
CPC ............. *G08G 1/22* (2013.01); *G05D 1/0295* (2013.01); *G08G 1/162* (2013.01); *G16Y 10/40* (2020.01); *G16Y 40/35* (2020.01); *H04W 4/44* (2018.02)

(58) Field of Classification Search
CPC .......... G08G 1/22; G08G 1/16; G08G 1/0133; G08G 1/0141; G08G 1/096725; G08G 1/096741; G08G 1/096783; G08G 1/164
See application file for complete search history.

(56) References Cited

U.S. PATENT DOCUMENTS 11,528,716 B2 * 12/2022  Freda ................. H04W 72/56
11,546,113 B2 *  1/2023  Parkvall ............. H04W 72/51
(Continued)

FOREIGN PATENT DOCUMENTS

CN         1975802 A       6/2007
CN       102546696 B   *   9/2014
(Continued)

OTHER PUBLICATIONS

TS-0001 Functional_Architecture-V2.10.0, Aug. 31, 2016, 427 pages.
(Continued)

*Primary Examiner* — Redhwan K Mawari
(74) *Attorney, Agent, or Firm* — Conley Rose, P.C.

(57) ABSTRACT

This application provides an internet of things platoon communication method. In this method, an internet of things platform plans and manages a communication mode of a platoon in a traveling process. In the traveling process, the platoon selects, based on a communication mode plan sent by the platform, a communication mode corresponding to a current location of the platoon for communication. Because the platform can obtain global information such as a network and a map, the communication mode planned by the platform is more reasonable and accurate. This resolves a problem of one-by-one switchover and repeated switchover of fleet members at road sections such as a congested road section, a road section with poor network coverage, and a multi-block road section.

20 Claims, 15 Drawing Sheets

(51) Int. Cl.
*G08G 1/16* (2006.01)
*G16Y 10/40* (2020.01)
*G16Y 40/35* (2020.01)
*H04W 4/44* (2018.01)

(56) References Cited

U.S. PATENT DOCUMENTS

| | | | |
|---|---|---|---|
| 2010/0256852 A1* | 10/2010 | Mudalige | G08G 1/164 |
| | | | 701/24 |
| 2017/0289733 A1* | 10/2017 | Rajagopal | H04L 5/0082 |
| 2017/0369062 A1* | 12/2017 | Saigusa | B60W 50/04 |
| 2018/0047293 A1* | 2/2018 | Dudar | G05D 1/0257 |
| 2018/0120861 A1* | 5/2018 | Saxena | G05D 1/0291 |
| 2018/0190128 A1* | 7/2018 | Saigusa | B60W 40/04 |
| 2018/0224846 A1* | 8/2018 | Kovacs | G08G 1/096783 |
| 2018/0278385 A1* | 9/2018 | Wu | H04W 16/10 |
| 2018/0279096 A1* | 9/2018 | Wu | H04W 72/121 |
| 2018/0359619 A1* | 12/2018 | Ma | H04W 4/44 |
| 2019/0349719 A1* | 11/2019 | Pattan | H04W 4/08 |

FOREIGN PATENT DOCUMENTS

| | | |
|---|---|---|
| CN | 105374203 A | 3/2016 |
| CN | 105610950 A | 5/2016 |
| CN | 106331980 A | 1/2017 |
| CN | 106332122 A | 1/2017 |
| CN | 106559337 A | 4/2017 |
| CN | 106559732 A | 4/2017 |
| CN | 106643769 A | 5/2017 |
| CN | 107757534 A | 3/2018 |
| CN | 107808514 A | 3/2018 |
| CN | 107846434 A | 3/2018 |
| CN | 107972668 A | 5/2018 |
| EP | 3257171 B1 | 7/2019 |
| KR | 20180023100 A | 3/2018 |
| WO | 2017036510 A1 | 3/2017 |
| WO | 2018064179 A1 | 4/2018 |

OTHER PUBLICATIONS

Qualcomm, Inc., "Completing V2X platooning communications requirements", 3GPP TSG-SA WG1 Meeting #76 S1-163139, Tenerife, Spain, Nov. 7-11, 2016, Total 4 Pages.

Hossain, E., et al., "Vehicular telematics over heterogeneous wireless networks: A survey," Computer Communication, XP026911850, vol. 33, No. 7, May 3, 2010, 19 pages.

* cited by examiner

INTERNET OF THINGS (IOT) PLATOON COMMUNICATION METHOD

CROSS-REFERENCE TO RELATED APPLICATIONS

This is a continuation of Int'l Patent App. No. PCT/CN2019/094654 filed on Jul. 4, 2019, which claims priority to Chinese Patent App. No. 201810736940.5 filed on Jul. 6, 2018, which are incorporated by reference.

FIELD

This disclosure relates to the communications field, and in particular, to an internet of things (IoT) platoon communication method.

BACKGROUND

Vehicle-to-everything (V2X) is a typical application of an IoT technology in the field of transportation systems. Two V2X communication modes are defined in the 3rd Generation Partnership Project (3GPP): direct interface PC5 and cellular interface Uu. In the PC5 mode, vehicles communicate with each other in a device-to-device (D2D) manner through a PC5 interface. The PC5 communication mode is used in short-distance communication and has a lower latency but lower reliability. In the Uu mode, vehicles communicate with a base station through a Uu interface, and communication between the vehicles needs to be forwarded through the base station and a network. The Uu communication mode is used in long-distance communication and has a slightly higher delay but higher reliability.

In V2X, there is a platooning service scenario. Platooning refers to a service scenario in which a plurality of vehicles follow each other at a very short distance. When member vehicles in a fleet travel in a queue, the PC5 communication mode is more suitable for communication between the members in the fleet. However, a PC5 communication quality is greatly affected by congestion and blocking. Consequently, the PC5 communication quality may deteriorate or even PC5 communication may be disconnected. For example, when the fleet travels into a high-speed congested road section, or is blocked by a building or another vehicle, the communication between the member vehicles in the fleet may be abnormal, and a rear vehicle cannot obtain a driving status and intention information of a front vehicle in time. Because the member vehicles in the fleet follow each other at a short distance, a traffic accident is very likely to occur. To ensure continuity and reliability of fleet communication, a method for planning and adjusting a communication mode of the fleet is urgently needed.

SUMMARY

In an IoT platoon communication method, an IoT platform plans and manages a communication mode of a platoon in a traveling process. In the traveling process, the platoon selects, based on a communication mode plan sent by the platform, a communication mode corresponding to a current location of the platoon for communication. Because the platform can obtain global information such as a network and a map, the communication mode planned by the platform is more reasonable and accurate. This resolves a problem of one-by-one switchover and repeated switchover of fleet members at road sections such as a congested road section, a road section with poor network coverage, and a multi-block road section.

The IoT platform plans the communication mode of the platoon based on platoon information, and optionally, with reference to planning assistance information (such as network status information and map information). The platoon includes a plurality of platoon members. The platoon information includes an identification (ID) of each platoon member in the platoon, an ID of a leader, a communication mode supported by each platoon member, and platooning scope information. The leader is one of the platoon members in the platoon. The platooning scope information is platooning route information or platooning area information. It should be noted that the IoT platform may obtain all the platoon information at a time from one entity (for example, a lead vehicle). Alternatively, the IoT platform may separately obtain parts of the platoon information from different entities in a plurality of steps, for example, obtains information about each platoon member from the platoon member, and then obtains the ID of the platoon member included in the platoon, the ID of the leader, and the platooning scope information from the lead vehicle or a V2X service server.

The IoT platform sends the communication mode that is of the platoon and that is planned by the IoT platform to the leader in the platoon or each platoon member in the platoon. The communication mode of the platoon is used to indicate a communication mode supposed to be used by the platoon member in the platoon in a platooning scope. As mentioned above, the platform plans a recommended communication mode for a fleet on a traveling route in advance based on various factors. The leader and the fleet members adjust the communication mode in the traveling process based on the planning of the platform. This ensures reliable and continuous communication when there is no unexpected network change, and reduces performance consumption of a vehicle in locally decision-making or determining of communication mode adjustment.

In a possible embodiment, the planning assistance information is a communication mode supported by a geographic area or scope. The communication mode supported by the geographic area or scope is obtained by the platform based on the network status information and the map information. The network status information includes at least one of coverage information of a wireless signal and congestion information of the wireless signal. The map information includes at least one of a road topology and a building location relationship.

The IoT platoon communication method not only includes the foregoing static planning of the communication mode of the fleet, but also includes dynamic update of the communication mode of the fleet.

In one case, the platform may re-plan a communication mode of the platoon in a future traveling scope (in other words, a scope that the platoon has not traveled to) based on a network status change or a map information change.

In another case, the communication mode supported by the platoon member may dynamically change due to some unexpected situations such as traffic congestion and vehicle blocking. In this case, the platoon member needs to notify the platform of an updated communication mode supported by the platoon member in time, and the platform needs to respond in time. After comprehensively considering the updated communication mode supported by the platoon member and a communication mode currently used by another platoon member in the platoon, the platform plans a communication mode currently supposed to be used by the platoon member, and notify the platoon member in time.

In a possible embodiment, overall communication efficiency of the entire platoon is considered. Because a communication mode supported by a platoon member changes, a communication mode currently used by another platoon member in the platoon may need to be adjusted. In this case, the platform further needs to notify, through the leader or directly, the another platoon member that needs to adjust the current communication mode.

According to the IoT platoon communication method, the IoT platform has communication mode information of the platoon, including the communication mode supported by the platoon member and a communication mode currently used by the platoon member. When the communication mode currently used by the platoon member is Uu, a service message may be directly forwarded by the IoT platform to the platoon member without being forwarded by the leader. This avoids detour of a message forwarding path and repeated forwarding of the message, improves communication efficiency, and saves network communication resources.

The platoon members including the leader also need to make corresponding function improvements, to support the IoT platoon communication method.

In an implementation, the leader serves as a representative of the platoon to provide, to the IoT platform, platoon information that may be required for planning by the IoT platform. When the communication mode supported by the platoon member or the communication mode currently used by the platoon member changes, the leader also notifies the IoT platform.

In an implementation, the platoon members each may report information related to a respective communication mode to the IoT platform, for example, a supported communication mode and a currently used communication mode. Then, the leader or a platoon management entity notifies the IoT platform of platoon member composition, for example, the ID of the platoon member, the ID of the leader, the platooning scope information, and the like. When the communication mode supported by the platoon member or the communication mode currently used by the platoon member changes, the platoon member directly notifies the IoT platform.

In an implementation, the communication mode that is of the platoon and that is planned by the IoT platform or a communication mode that is currently supposed to be used by a platoon member and that is planned by the IoT platform is sent to the leader, and the leader notifies, based on the planning, another platoon member to adjust a communication mode.

In an implementation, the communication mode that is of the platoon and that is planned by the IoT platform or a communication mode that is currently supposed to be used by a platoon member and that is planned by the IoT platform may be directly sent to each platoon member, and each platoon member adjusts a communication mode of the platoon member based on the planning.

The IoT platoon communication method is applied to the IoT platform or an IoT server, or a communications apparatus built in or integrated in the platoon member or the leader. Therefore, this disclosure further provides an apparatus or a server for implementing the IoT platoon communication method.

In addition, a computer-readable storage medium stores an instruction, and when the instruction is run on a computer, the computer is enabled to perform the foregoing IoT platoon communication method.

Finally, a computer program product including an instruction. runs on a computer to enable the computer to perform the foregoing IoT platoon communication method.

DETAILED DESCRIPTION

Figure 1:
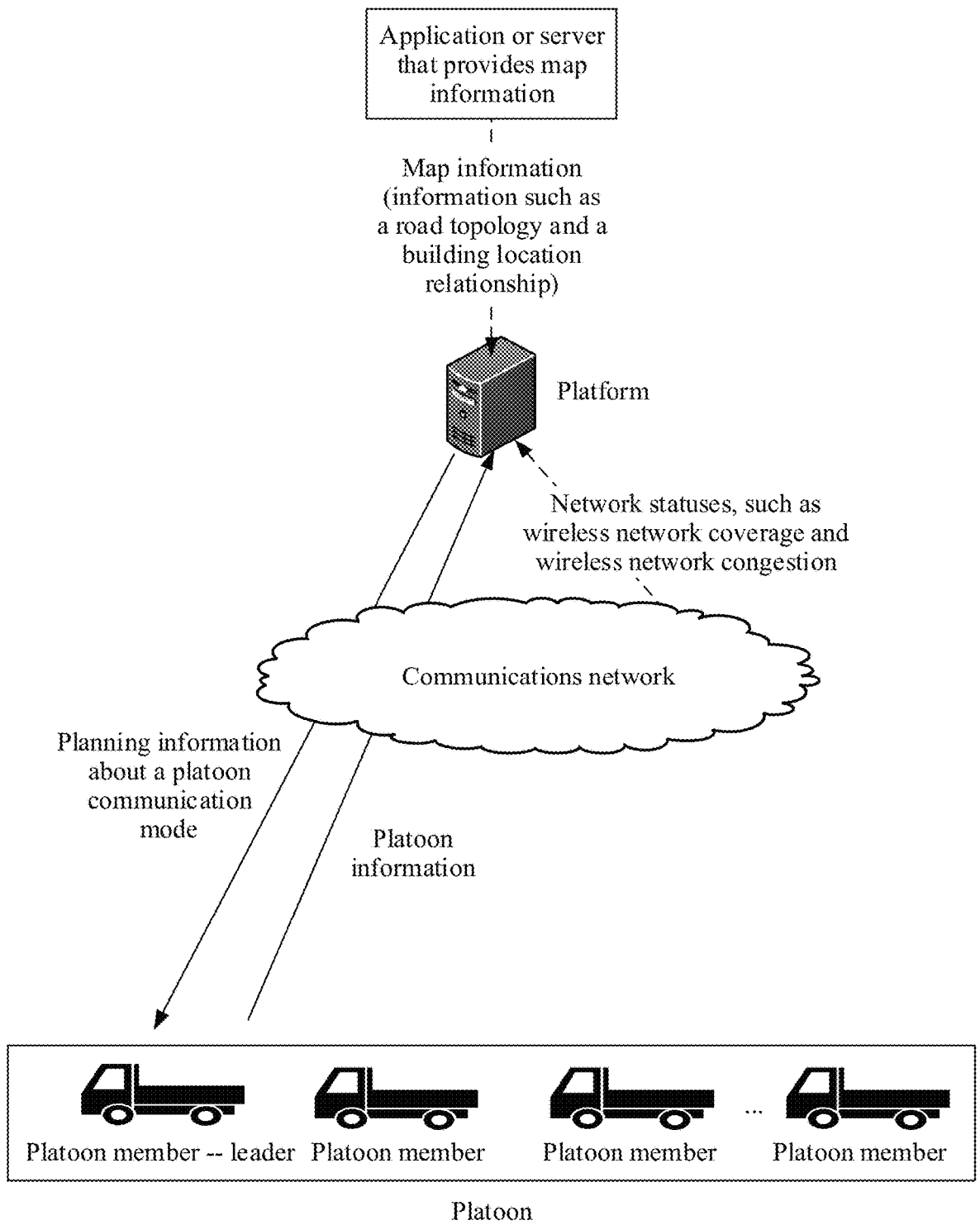
FIG. 1 is a schematic diagram of an architecture of an IoT system that presents a design idea.

FIG. 1 shows a system overview of a method according to an embodiment. An IoT system shown in FIG. 1 includes an application or a server that provides map information, an IoT server or an IoT platform, a platoon, and a communications network. The map information includes information such as a road topology, a building location relationship, or a blocking relationship. The application or the server that provides the map information may be a Google map, a municipal road relationship system, or the like. The platoon includes two or more platoon members. One of the platoon members functions as a leader. The platoon members including the leader can fly, or travel in a platoon or a queue. The leader has more functions and more responsibilities than another platoon member in the platoon. For example, the leader has one or more functions such as coordinating information exchange of the platoon members in the platoon, platoon running control, interacting with the server to assist in platoon management, or environment perception. A position relationship between the leader and the another platoon member in a platooning process is not limited. The platoon member supports one or more communication modes, for example, a D2D short-distance communication mode between the platoon members, and a communication mode in which the platoon member communicates with the platform through a communications network and communicates with another platoon member through platform forwarding. At any moment, the platoon member can use only one communication mode for communication. The platform plans, based on platoon information (such as a communication mode supported by the platoon member and a traveling route or a traveling area of the platoon), communication modes of the platoon member when the platoon member travels to different geographic areas. In a traveling process, the platoon adjusts, based on communication mode planning information sent by the platform, the communication mode of the platoon member. Optionally, when planning a communication mode of a group, the platform may further refer to planning assistance information, for example, a communication mode supported by a geographic area or scope. The communication mode supported by the geographic area or scope may be information configured on the platform, or may be obtained by the platform based on map information and network status information (for example, one or more pieces of information such as network coverage of a wireless signal in each communication mode or a network congestion status of the wireless signal in each communication mode). The map information is provided by a map server, and the network status information is provided by the communications network.

Notes:

First, FIG. 1 and this disclosure are mainly described by using a vehicle platoon as an example. The vehicle platoon is also referred to as a fleet or a platoon. A leader in the fleet is referred to as a lead vehicle. A person skilled in the art should understand that the method provided is irrelevant to a specific external form of a platoon member. Regardless of an aircraft platoon, a toy fleet, a tram fleet, a bicycle platoon, or another type of platoon, as long as a platoon member device has a communication capability, the platoon may adjust, in a traveling or moving process, a communication mode by using the method provided.

In addition, a type of the communications network shown in FIG. 1 is not limited, and a communications technology used for D2D communication between fleets is not limited either. The communications network may be a 3GPP communications network, or a communications network that provides another long-distance communications technology, for example, a communications network providing access such as SigFox and LoRa. Short-distance D2D communication between fleet members may be a PC5 communication mode defined in the 3GPP standard, or a communication mode that is based on another short-distance communications technology (such as Z-WAVE, Wi-Fi, or dedicated short-range communications (DSRC)). In the following embodiments, the 3GPP communications network is mainly used as an example to describe the method provided. However, a person skilled in the art should understand that the method is also applicable to adjustment or selection between any two or more communication modes of the platoon members.

Because a fifth-generation (5G)-based V2X standard has not been formulated, a fourth-generation (4G) communications network in 3GPP is used as an example to describe the method provided. However, a person skilled in the art should understand that the method provided is also applicable on a 5G network. A system architecture shown in FIG. 1 may be refined into a system architecture shown in FIG. 2.

Figure 2:
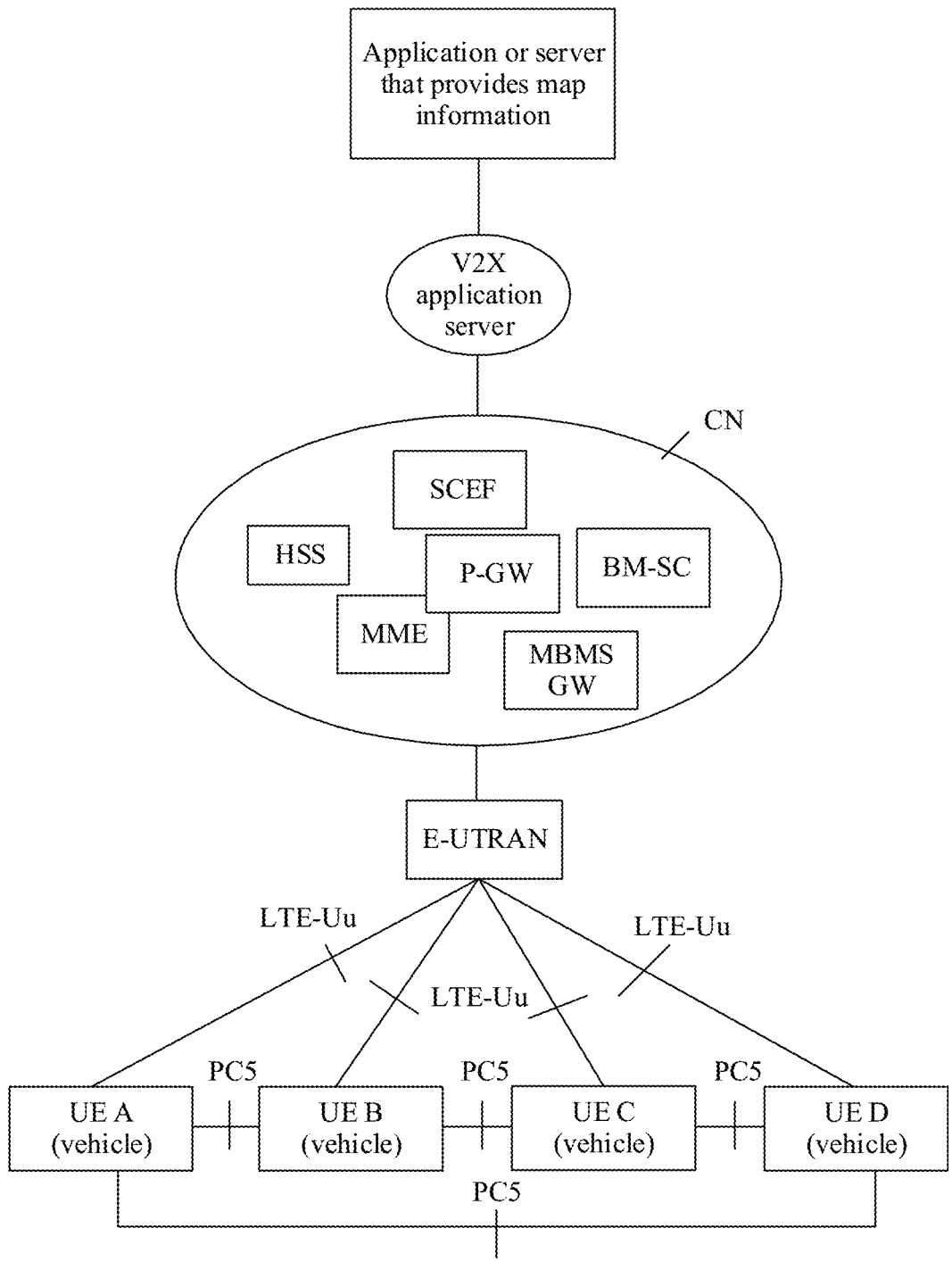
FIG. 2 is a schematic diagram, in which a 3GPP communications network is used as an example, of an architecture of an IoT system.

The communications network in FIG. 1 corresponds to the 4G communications network in 3GPP in FIG. 2, and specifically includes an Evolved Universal Terrestrial Radio Access Network (E-UTRAN) and a 4G core network (CN). The E-UTRAN includes a device or a network element such as a 4G base station. The 4G CN includes network elements such as a mobility management entity (MME), a packet data network gateway (P-GW), a broadcast/multicast service center (BM-SC), a multimedia broadcast multicast service gateway (MBMS-GW), and a service capability exposure function (SCEF).

The platform shown in FIG. 1 corresponds to a V2X application server (AS) shown in FIG. 2.

The fleet member or the platoon member shown in FIG. 1 corresponds to user equipment (UE) shown in FIG. 2. UE A, UE B, UE C, and UE D in FIG. 2 are fleet members in a same fleet, and the UE A is a lead vehicle.

The fleet members may access the E-UTRAN through a Long-Term Evolution (LTE) Uu interface and communicate with the platform through the CN. There is also a PC5 interface between the fleet members, and the fleet members may further communicate directly with each other through the PC5 interface. In other words, the fleet member supports at least one of a PC5 communication mode and a Uu communication mode, and the lead vehicle supports both the PC5 and the Uu, to facilitate fleet management or communication with the platform. It should be noted that only PC5 interfaces between some vehicles are shown in FIG. 2, and other vehicles that do not display a PC5 interface may also communicate with each other by using the PC5. For example, the UE A and the UE C may also communicate with each other by using the PC5.

In the PC5 mode, vehicles communicate with each other in a D2D manner through the PC5 interface. The PC5 communication mode is used in short-distance communication and has a lower latency but lower reliability. In the Uu mode, the vehicles communicate with a base station through the Uu interface, and communication between the vehicles needs to be forwarded through the base station and the platform. The Uu communication mode is used in long-distance communication and has a slightly higher delay but higher reliability. It should be further noted that, when the vehicle supports the Uu communication mode, a downlink message from the platform to the vehicle (in other words, a message sent by the platform to the vehicle) may be delivered by the platform to the vehicle in a unicast manner through the P-GW, and may alternatively be delivered to the vehicle in a multimedia broadcast multicast service (MBMS) broadcast or multicast manner through the BM-SC and the MBMS-GW. When a plurality of communication modes are available for both the platoon member and the platform, whether the platoon members communicate with each other or the platform sends the downlink message to the platoon member, a communication mode currently used by the platoon member needs to be first determined. In this way, communication between the platoon members, and between the platoon member and the platform can be efficient. It is assumed that the UE B currently uses the Uu communication mode, and the platform needs to send a message (for example, a notification message indicating the UE B to leave the fleet, or a message that is forwarded by the platform to the UE B and that is sent by another network device or terminal device) to the fleet member UE B. If the platform does not sense the communication mode currently used by the fleet member, the platform may send the message to be sent to the UE B to the lead vehicle UE A. The platform indicates the lead vehicle UE A to forward the message to the UE B by using the PC5 communication mode. However, because the communication mode currently used by the UE B is the Uu, the UE A needs to send the message to the platform again, and indicates the platform to forward the message to the UE B by using the Uu communication mode.

It can be learned that when the platform does not sense the communication mode currently used by the fleet member, a problem of redundant message transmission exists in fleet communication. Therefore, not only the fleet needs a method for efficiently and timely adjusting the communication mode, but also the platform needs to sense the current communication mode of the fleet member in real time, to improve communication efficiency of the fleet.

In addition to planning the communication mode for the fleet, the platform further needs to dynamically update the communication mode of the fleet member to sense the current communication mode of the fleet member in real time. That the platform dynamically updates the communication mode of the platoon member includes two cases or scenarios. One case is that the platform actively updates the communication mode of the fleet or the communication mode of the fleet member. The other case is that the fleet member requests the platform to update the communication mode of the fleet member. If the platform receives a network status change event sent by the communications network, the platform actively updates the communication mode of the fleet in an area affected by a network change. If the platform receives a communication mode change request sent by the fleet member, the platform determines a communication mode based on information such as a communication mode supported by the fleet member, the current communication mode used by the fleet member, and a network status of a traveling area, and indicates the fleet member to update the communication mode. It should be noted that the communication mode of the fleet is an overall attribute of the fleet or the group, and the communication mode of the fleet is applicable to each member in the fleet. The communication mode of the fleet member is an individual attribute of the fleet member.

Figure 3:
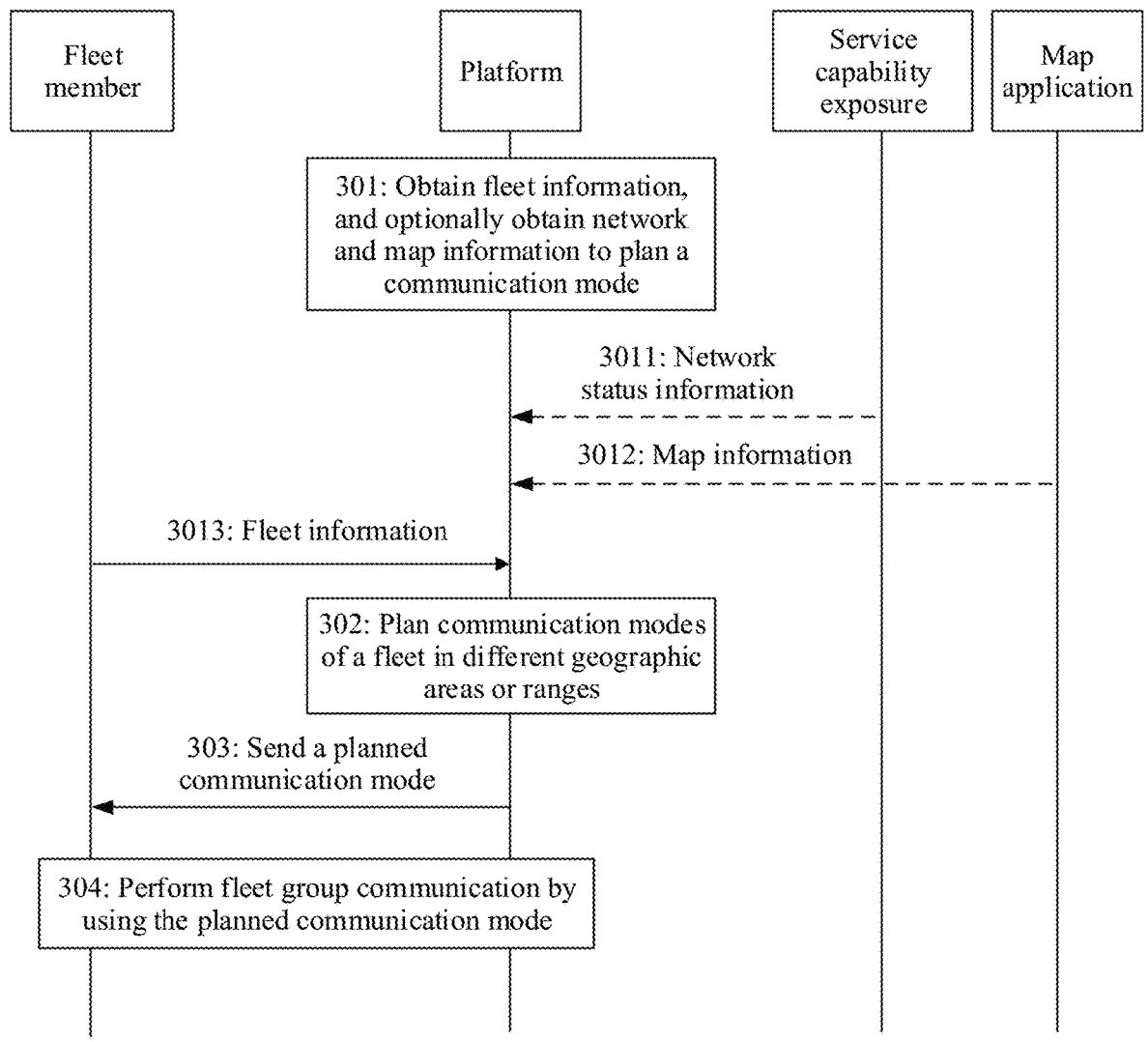
FIG. 3 is an outline flowchart of a method for planning a communication mode of a fleet member according to an embodiment.
Figure 4:
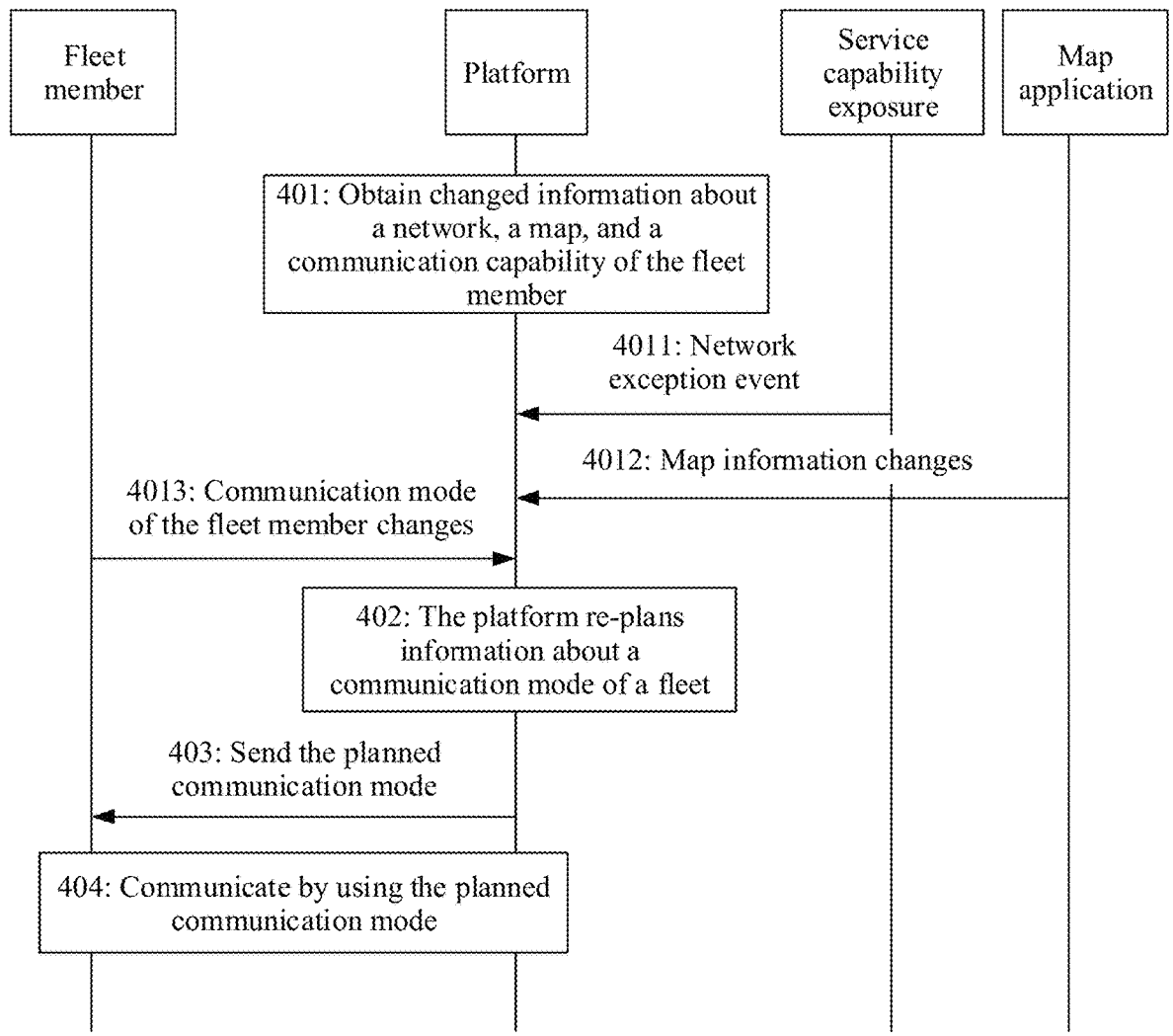
FIG. 4 is an outline flowchart of a method for updating communication mode planning of a fleet member according to an embodiment.

The foregoing describes a general concept of the method provided. FIG. 3 and FIG. 4 are brief flowcharts of methods for implementing the concept based on the system architectures shown in FIG. 1 and FIG. 2.

FIG. 3 is a brief flowchart of a method for planning a communication mode.

301: A platform obtains fleet information, and optionally, further obtains planning assistance information, for example, a communication mode supported by a geographic area or scope. Optionally, in step 3011, the platform may obtain network status information from a service capability exposure SCEF network. Optionally, in step 3012, the platform may obtain map information from an application server. Then, the communication mode supported by the geographic area or scope is obtained based on the information obtained in step 3011 and step 3012. In step 3013, a fleet sends the fleet information to the platform after the fleet is successfully platooned, where the fleet information includes at least an ID of a lead vehicle, an ID of a fleet member, a communication mode supported by the fleet member, and location information of the fleet, and optionally, further includes a communication mode currently used by the fleet member. The location information of the fleet is used to identify a traveling path or a traveling scope of the fleet, and may be a geographic area scope or a traveling path.

302: The platform plans communication modes of the fleet in different areas or scopes based on the fleet information. Optionally, when planning the communication mode of the platoon, the platform may further refer to the communication mode supported by the geographic area or scope. The communication mode supported by the geographic area or scope may be information configured on the platform, or may be obtained by the platform through analysis or planning based on the map information obtained in step 3011 and the network status information obtained in step 3012. It should be noted that a specific step of planning the communication mode by the platform is not limited. For example, the platform may first determine, based on the network status information and the map information, a communication mode supported by each area on a map, and then determine, based on the fleet information obtained in step 3013 and with reference to the previously determined communication mode supported by each area, a communication mode of the fleet in the traveling area or the traveling path. Alternatively, after the fleet information is obtained in step 3013, the platform may directly plan the communication mode based on the fleet information, the network status information, and the map information. It should be further noted that when planning the communication mode of the fleet, the platform considers the fleet as a whole. In other words, the communication mode of the fleet is applicable to all fleet members in the fleet.

303: The platform delivers, to the fleet, the communication mode that is of the fleet and that is planned by the platform. Specifically, the communication mode of the fleet may be delivered to a lead vehicle. Alternatively, the communication mode of the fleet may be delivered to each fleet member.

304: In a traveling process of the fleet, a communication mode of the fleet member in the fleet is adjusted based on a location of the fleet and the communication mode planned by the platform. Because the fleet includes a plurality of vehicles, the location of the fleet may have a plurality of definitions. This is not limited. For example, the location of the fleet may be a location of the lead vehicle, or a location of another member vehicle in the fleet, or a current location of a middle part of the fleet. If the platform delivers the planned communication mode to the lead vehicle in step 303, it is recommended that the location of the lead vehicle be used as the location of the fleet. In the traveling process of the fleet, the lead vehicle adjusts the communication mode of the fleet member based on a current location of the lead vehicle and the communication mode planned by the platform. If the platform delivers the planned communication mode to each fleet member in step 303, in the traveling process of the fleet, each fleet member may adjust a communication mode of the fleet member based on a current location of the fleet member and the communication mode planned by the platform.

FIG. 4 is a brief flowchart of a method for updating a communication mode.

401: A change of the network status information or the map information may trigger the platform to update communication mode planning of the fleet. The fleet member may also request the platform to update communication modes of one or more fleet members. As shown in step 4011, when an exception event occurs in wireless signal coverage of a communications network, the communications network sends, to the platform, information such as the network exception event (for example, a notification of the network exception event is sent to the platform through a service capability exposure network element shown in the figure, or the notification is sent to the platform through another network element), and an event location and an event type in the notification of the network exception event. The event type includes but is not limited to Uu signal congestion, PC5 network congestion, and the like. For another example, in step 4012, the platform receives a map change event sent by a map application, and the map change event includes an event location and an event type. The event type includes but is not limited to adding a blocked area, deleting a blocked area, and the like. For another example, in step 4013, the platform receives a change message of the fleet member or a change message of the communication mode supported by the fleet member. The message in step 4013 may be uniformly sent by the lead vehicle in the fleet to the platform, or may be sent by another fleet member to the platform.

402: The platform redetermines a communication mode of the fleet or a communication mode of the fleet member based on information about the fleet member, the network status information, and the map information.

403: The platform delivers an updated communication mode of the fleet or an updated communication mode of the fleet member to the fleet member.

404: The fleet and the platform perform communication and message forwarding based on the updated communication mode.

FIG. 3 and FIG. 4 briefly describe the overall planning process of the fleet communication mode and the communication mode update process. The following further describes the processes shown in FIG. 3 and FIG. 4 in detail with reference to specific examples.

Figure 5A:
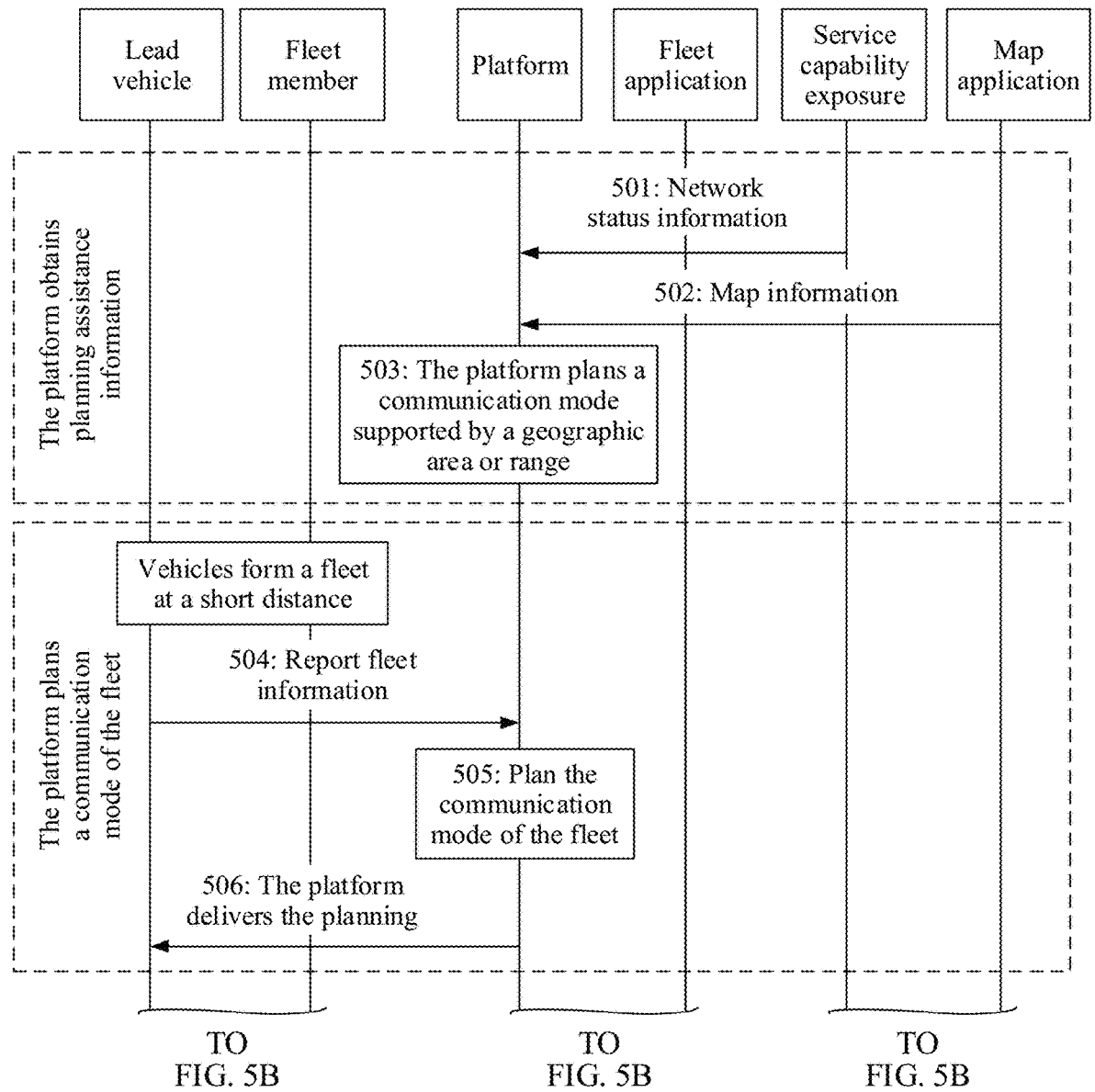
FIG. 5A and FIG. 5B are a flowchart of a method for planning a communication mode of a fleet member according to an embodiment.
Figure 5B:
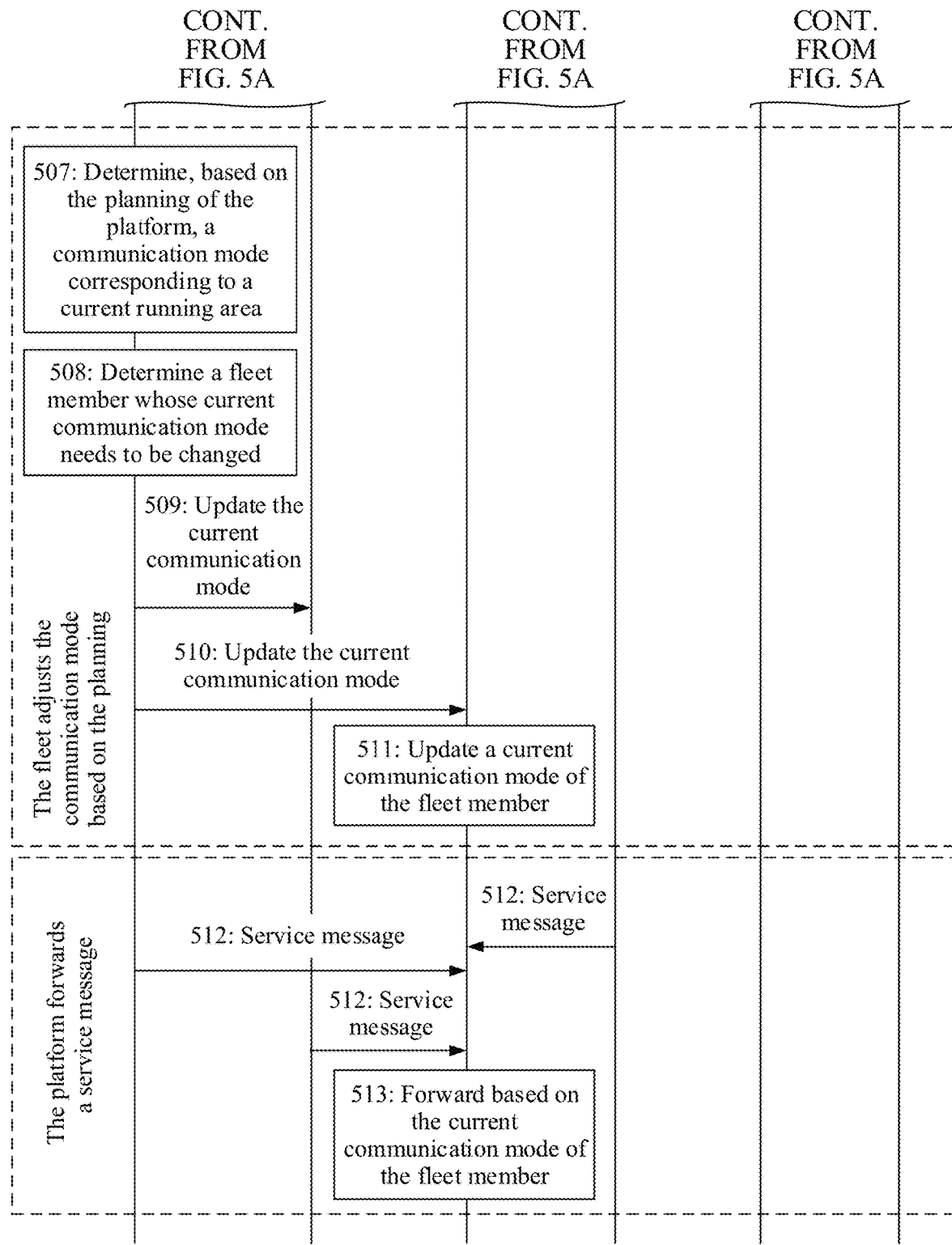

FIG. 5A and FIG. 5B show a further detailed process of the process shown in FIG. 3.

501: The platform receives Uu signal coverage information and MBMS signal coverage information sent by a service capability exposure entity.

502: The platform receives map information sent by a map provider, where the map information includes information such as a road topology and building coverage.

Figure 6:
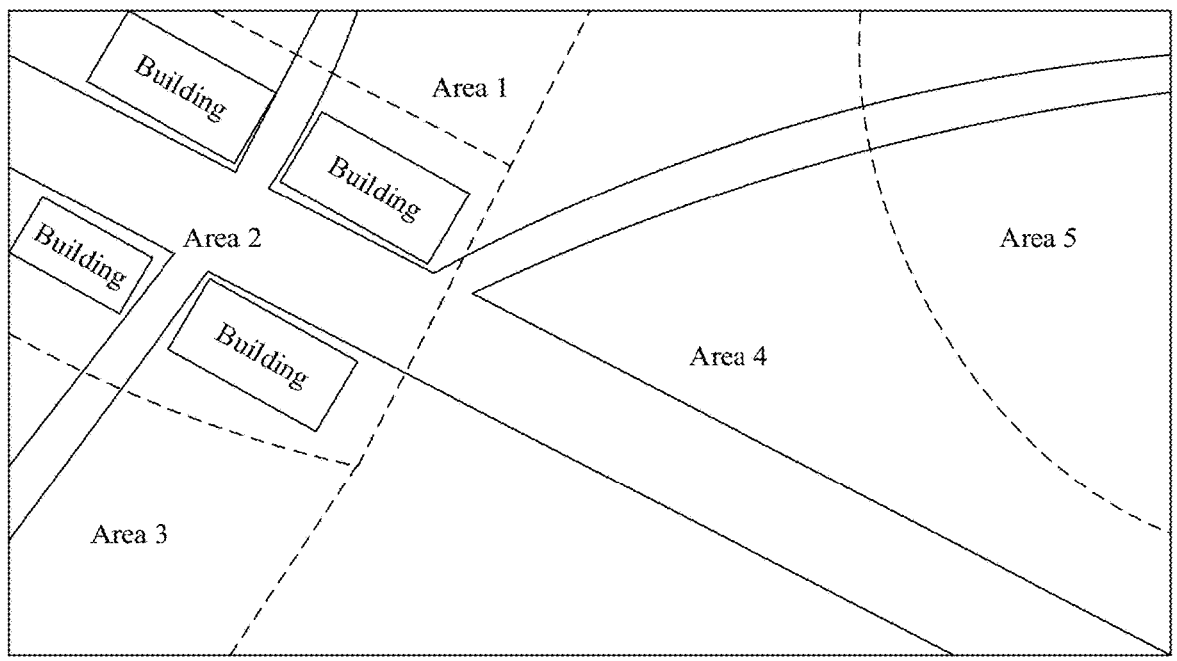
FIG. 6 is a schematic diagram of geographic area division according to an embodiment.
Figure 7:
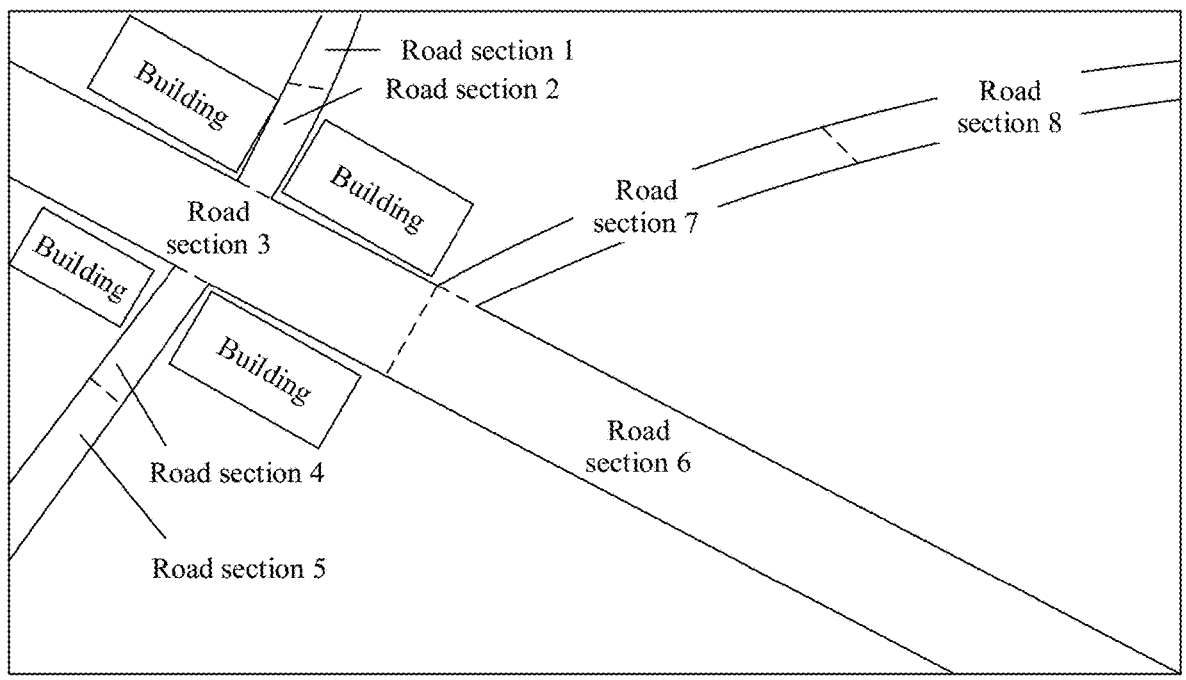
FIG. 7 is a schematic diagram of road section division according to an embodiment.

503: The platform determines, based on a map and network coverage, a communication mode supported by each area. The communication mode supported by the area refers to a communication mode that can be provided by the area, or a communication mode that can be used by a communications device in the area. The area may be divided based on a geographic scope, or may be divided based on the road topology. FIG. 6 is a schematic diagram of determining the communication mode based on the geographic scope. In the figure, communication modes supported by different areas are planned based on the geographic scope. It is assumed that a matching result between a network status reported by the communications network and a map area is shown in Table 1. An area 2 is used as an example for description. The area 2 is covered by a Uu network and an MBMS network, and the Uu network and the MBMS network are not congested. However, a PC5 network in the area 2 is currently congested. In this case, the platform may plan that communication modes supported by the area 2 are Uu and MBMS. FIG. 7 is a schematic diagram of determining the communication mode based on the road topology. In the figure, communication modes of different road sections are planned based on the road topology. It is assumed that a matching result between the network status reported by the communications network and the road topology is shown in Table 2. A road section 3 is used as an example for description. The road section 3 is covered by both the Uu network and the MBMS network, and the Uu network and the MBMS network are not congested. However, the map information indicates that the road section 3 is severely blocked by buildings (not suitable for PC5 communication). In this case, the platform may plan that communication modes supported by the road section 3 are the Uu and the MBMS.

TABLE 1

Network statuses of an area and communication mode that is supported by the area and that is planned by the platform

|  | Network coverage status | Network congestion status | Communication mode that is supported by the area and that is planned by the platform |
| --- | --- | --- | --- |
| Geographic area 1 | Uu | None | Uu, PC5 |
| Geographic area 2 | Uu, MBMS | PC5 | Uu, MBMS |
| Geographic area 3 | Uu | None | Uu, PC5 |
| Geographic area 4 | Uu, MBMS | None | Uu, MBMS, PC5 |
| Geographic area 5 | None | None | PC5 |

TABLE 2

Network statuses of a road section and communication mode that is supported by the area and that is planned by the platform

|  | Network coverage status | Network congestion status | Communication mode that is supported by the area and that is planned by the platform |
| --- | --- | --- | --- |
| Road section area 1 | Uu | None | Uu, PC5 |
| Road section area 2 | Uu, MBMS | PC5 | Uu, MBMS |
| Road section area 3 | Uu, MBMS | PC5 | Uu, MBMS |
| Road section area 4 | Uu, MBMS | PC5 | Uu, MBMS |
| Road section area 5 | Uu | None | Uu, PC5 |
| Road section area 6 | Uu, MBMS | None | Uu, MBMS, PC5 |
| Road section area 7 | Uu, MBMS | None | Uu, MBMS, PC5 |
| Road section area 8 | None | None | PC5 |

504: The lead vehicle in the fleet reports the platoon (namely, the fleet) information to the platform. An occasion at which the lead vehicle reports the fleet information is not limited. For example, the fleet information may be reported to the platform after the vehicles form the fleet at a short distance. The reported fleet information includes at least a platoon ID or a fleet ID, the ID of the lead vehicle, (the ID of the fleet member, the communication mode supported by the fleet member, or the communication mode currently used by the fleet member (optional)) (0, . . . , n), or traveling scope information of the fleet. The reported fleet information should include an ID of each fleet member including the lead vehicle, a communication mode (for example, one or more of the Uu, the PC5, and the MBMS) supported by each fleet member, and a communication mode (for example, any one of the Uu, the PC5, and the MBMS) currently used by each fleet member. The traveling scope information of the fleet may be information about a traveling area of the fleet, or may be an ID of an administrative region (for example, Xi'an High-tech Zone, or a number corresponding to the region on the map), or may be a polygon area formed by geographic coordinate points (for example, P1, P2, P3, and P4, where P represents a geographic coordinate point, the traveling area is a closed polygon area formed by sequentially connecting the P1 to the P4, and longitude and latitude information of each coordinate point may be indicated by using a World Geodetic System (WGS)), or may be fleet traveling route information. A possible manner of expressing a traveling route is: a start point, coordinates of middle intersections (0, . . . , n) (to be specific, coordinates of a 0th to an nth middle intersection), and an end point. The longitude and latitude information of each coordinate point may be indicated by using the WGS, for example, latitude/longitude (31.329250 121.223650). In a possible implementation, the ID of the fleet member or the ID of the lead vehicle may be a vehicle ID number (IDVIN) of the vehicle on delivery, or may be an ID allocated by the platform to the vehicle after the vehicle is registered with the platform in advance. In addition, uniqueness of the platoon ID reported by the lead vehicle needs to be ensured. In a possible implementation, the platoon ID reported by the lead vehicle may be an ID pre-allocated by the platform to the lead vehicle or the fleet in advance or a VIN of the lead vehicle. It should be noted that the communication mode currently used by the fleet member is not necessary information for the platform to plan the communication mode of the fleet. The fleet may report, by using a message, the communication mode currently used by the fleet member to the platform in step 504, or may subsequently notify, by using another message, the platform of the communication mode currently used by each fleet member.

Figure 8:
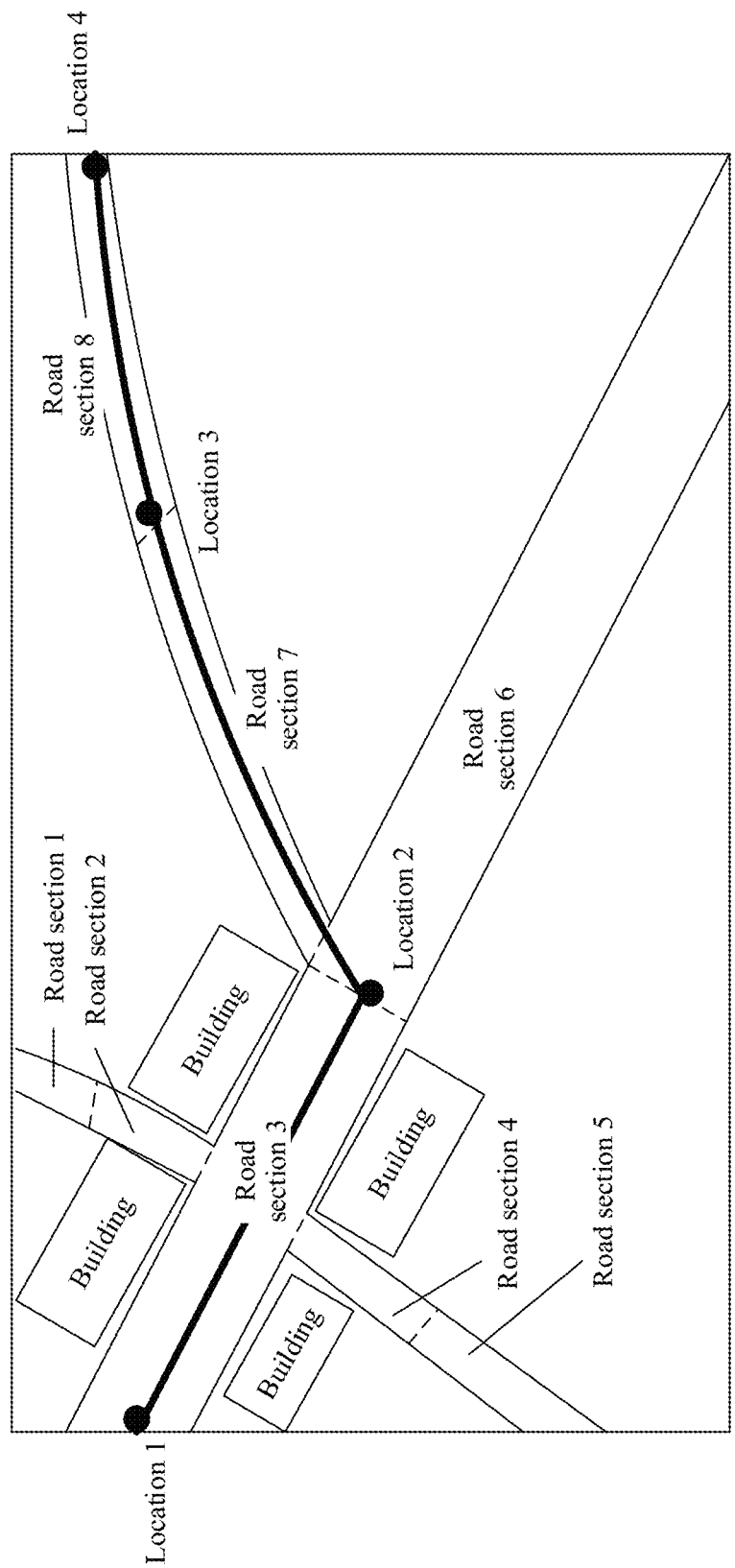
FIG. 8 is a schematic diagram of traveling scope information according to an embodiment.

505: The platform sets, based on the communication mode supported by the fleet member, the location information of the fleet, and the communication mode supported by the area, a communication mode used by the fleet in an area. For example, the fleet member supports the PC5 and the Uu. The fleet traveling route information is marked by a bold solid line in FIG. 8, and coordinates of locations 1, 2, 3, and 4 are provided based on a fleet traveling direction. Communication modes that are of the platoon and that are planned by the platform are: the location 1->the location 2, the Uu; the location 2->the location 3, the PC5; and the location 3->the location 4, the PC5. It should be noted that when the platform manages the fleet as a platoon, both the fleet information reported by the fleet and the communication mode that is of the fleet and that is planned by the platform for the fleet may be used as platoon-related information to be recorded and managed on the platform.

506: The platform sends, to the lead vehicle based on a currently used communication mode reported by the lead vehicle, communication mode planning of the fleet, namely, communication mode planning information of the fleet on the traveling route, for example, the location 1->the location 2, the Uu; the location 2->the location 3, the PC5; and the location 3->the location 4, the PC5. Optionally, the platform may alternatively send the planned communication mode of the fleet to each fleet member, and the platform needs to deliver a message based on the communication mode currently used by each fleet member.

In step 506, if the platform sends the communication mode of the fleet to the lead vehicle, step 507 to step 510 are performed.

507: In the traveling process of the fleet, the lead vehicle matches, based on a current traveling scope of the fleet, the communication mode that is of the fleet and that is delivered by the platform, to determine a communication mode currently used by the fleet, namely, a communication mode that is planned by the platform and that is supposed to be used by the fleet at a current location.

508: Because the lead vehicle records the communication mode currently used by each fleet member, after the lead vehicle determines the communication mode that is planned by the platform and that is currently supposed to be used by the fleet, the lead vehicle may determine a fleet member that currently uses a communication mode inconsistent with the communication mode planned by the platform.

509: The lead vehicle notifies the fleet member that needs to change the communication mode to update the currently used communication mode, where a message carries the communication mode that is planned by the platform and that is supposed to be used by the fleet at the current location.

510: The lead vehicle notifies the platform of the fleet member whose current communication mode changes, where a notification message includes a member ID and a changed communication mode that is currently used.

In step 506, if the platform sends the communication mode of the fleet to each fleet member, the following steps are performed.

Each fleet member performs the method performed by the lead vehicle in step 507. When determining that the communication mode that is planned by the platform and that is currently used by the fleet is inconsistent with the communication mode currently used by the fleet member, the fleet member adjusts the currently used communication mode to the communication mode currently used by the fleet, and indicates the lead vehicle and the platform to update the communication mode currently used by the fleet member. A notification message includes a member ID and a changed communication mode that is currently used.

511: The platform refreshes, based on the received message, the communication mode that is currently used by the fleet member and that is recorded by the platform. It should be noted that the platform manages the fleet and maintains information of the fleet in a form of a platoon. The platform stores not only overall information or an overall attribute of the fleet (for example, the communication mode that is of the fleet and that is planned by the platform), but also information about each fleet member (for example, the ID of the fleet member, the communication mode supported by the fleet member, and the communication mode currently used by the fleet member).

512: The platform may receive a service message sent by a fleet application, the lead vehicle, or a following vehicle, where the service message includes a source ID, a destination ID (for example, the ID of the fleet member), and a message payload.

513: After receiving the message, the platform forwards the message in the fleet based on the communication mode currently used by the fleet member. If the destination ID is a single fleet member, the platform directly sends the service message to the fleet member based on a communication mode currently used by the fleet member. When the communication mode currently used by the fleet member is the MBMS, the platform may send the service message to the fleet member in an MBMS multicast manner, or may directly send the service message to the fleet member in a unicast manner through a Uu interface. If the destination ID is the platoon ID or the fleet ID, the platform needs to send the service message to each fleet member based on the communication mode currently used by each member in the platoon or the fleet. For a fleet member whose currently-used communication mode is the PC5, the platform needs to select a lead vehicle in a platoon to which the fleet member belongs to forward the message. To be specific, the platform sends the service message to the lead vehicle in the platoon to which the fleet member belongs, and the lead vehicle forwards the service message to the fleet member based on the destination ID.

It can be learned from the method process shown in FIG. 5A and FIG. 5B that according to the method provided in the embodiments, the platform aggregates global information (the map information, the network status information, the fleet information, and the like), and plans in advance communication modes used by the fleet member in different areas. Because the global information such as the network and the map is integrated, the communication mode planned by the platform is more reasonable and accurate. This resolves a problem of one-by-one switchover and repeated switchover of the fleet members at road sections such as a congested road section, a road section with poor network coverage, and a multi-block road section.

In the processes shown in FIG. 3, FIG. 5A, and FIG. 5B, the platform plans or sets the communication mode of the fleet in the traveling process based on static information. However, in the traveling process of the fleet, a geographic location and a geographic environment of the vehicle dynamically change, and the network status also dynamically changes. Therefore, after the platform performs communication mode planning shown in FIG. 3 or FIG. 5A and FIG. 5B, the platform further needs to re-plan and adjust the communication mode of the fleet member based on dynamically changed information to ensure normal communication, as shown in FIG. 4.

Figure 9:
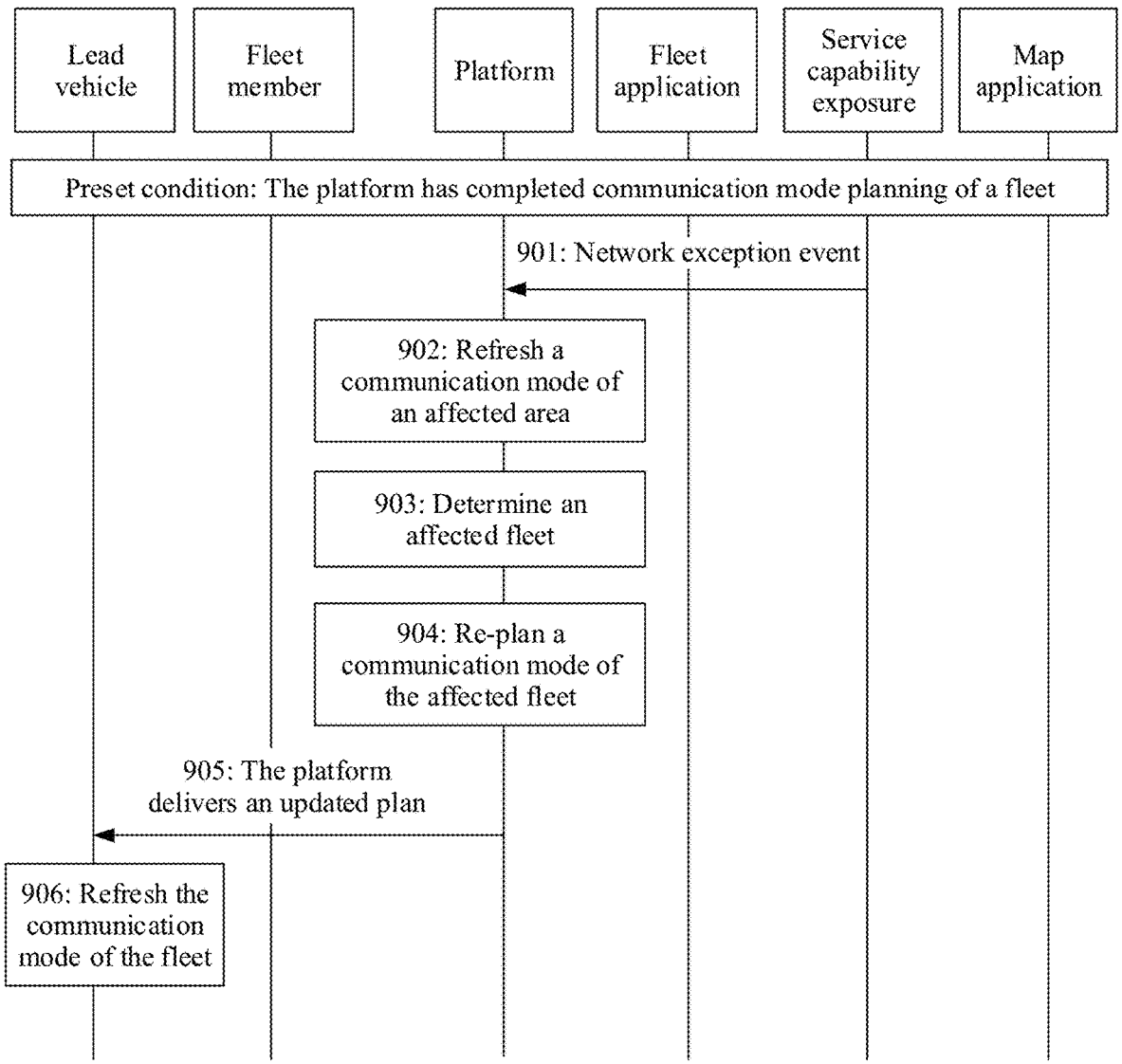
FIG. 9 is a flowchart of a method for updating communication mode planning of a fleet member according to an embodiment.

FIG. 9 shows a further detailed process in the scenario 4011 in FIG. 4. To be specific, a network status change triggers the platform to re-plan the communication mode of the fleet.

901: The platform receives the network status exception event reported by the service capability exposure entity (such as the SCEF), where the network status exception event includes the event location and the event type, and the event type may be the Uu signal congestion, the PC5 signal congestion, MBMS congestion, or the like. For example, the network status exception event is: the location 2->the location 3, PC5 congestion. It should be noted that the platform may further receive the network status exception event from a device or a network element such as a terminal, a BM-SC, or a radio access network congestion awareness function (RCAF). A processing manner of the platform is the same as the method shown in FIG. 9, and details are not described herein again.

902: The platform determines an affected area of the network status exception event, and refreshes a communication mode supported by the affected area.

903: If the communication mode of the affected area changes, an affected fleet is determined. To be specific, a fleet whose communication mode plan includes or relates to the affected area is determined. If a traveling route of a fleet A is the location 1->the location 2->the location 3->the location 4, and a current location of the fleet is the location 1, because a network status at the location 2->the location 3 changes, the fleet A is the affected fleet.

904: A communication mode of the affected fleet in the affected area is re-planned.

905: If the communication mode that is of the affected fleet in the affected area and that is re-planned by the platform is different from the previously planned communication mode (for example, the planning in step 505 and step 506), the platform delivers an updated plan to the lead vehicle, where the plan includes at least the communication mode that is of the affected fleet in the affected area and that is re-planned by the platform. For example, the platform re-plans a communication mode of the fleet at the location 2->the location 3. After the planning, the communication mode of the fleet at the location 2->the location 3 is: the location 2->the location 3, the Uu. It should be noted that, as described in step 506, optionally, the platform may alternatively choose to send the planned communication mode of the fleet to each fleet member, and the platform needs to deliver the message based on the communication mode currently used by each fleet member. The embodiment shown in FIG. 9 is described only by using an example in which planning information is sent to the lead vehicle.

906: The lead vehicle refreshes the communication mode of the fleet in the affected area, and manages the communication mode of the fleet based on a newly planned communication mode of the fleet (refer to step 507 to step 511).

In the method process shown in FIG. 9, the platform updates the communication mode planning of the fleet in time based on initial planning made in FIG. 5A and FIG. 5B and a change of the network status information or the map information, to ensure timeliness and effectiveness of platform planning.

Figure 10A:
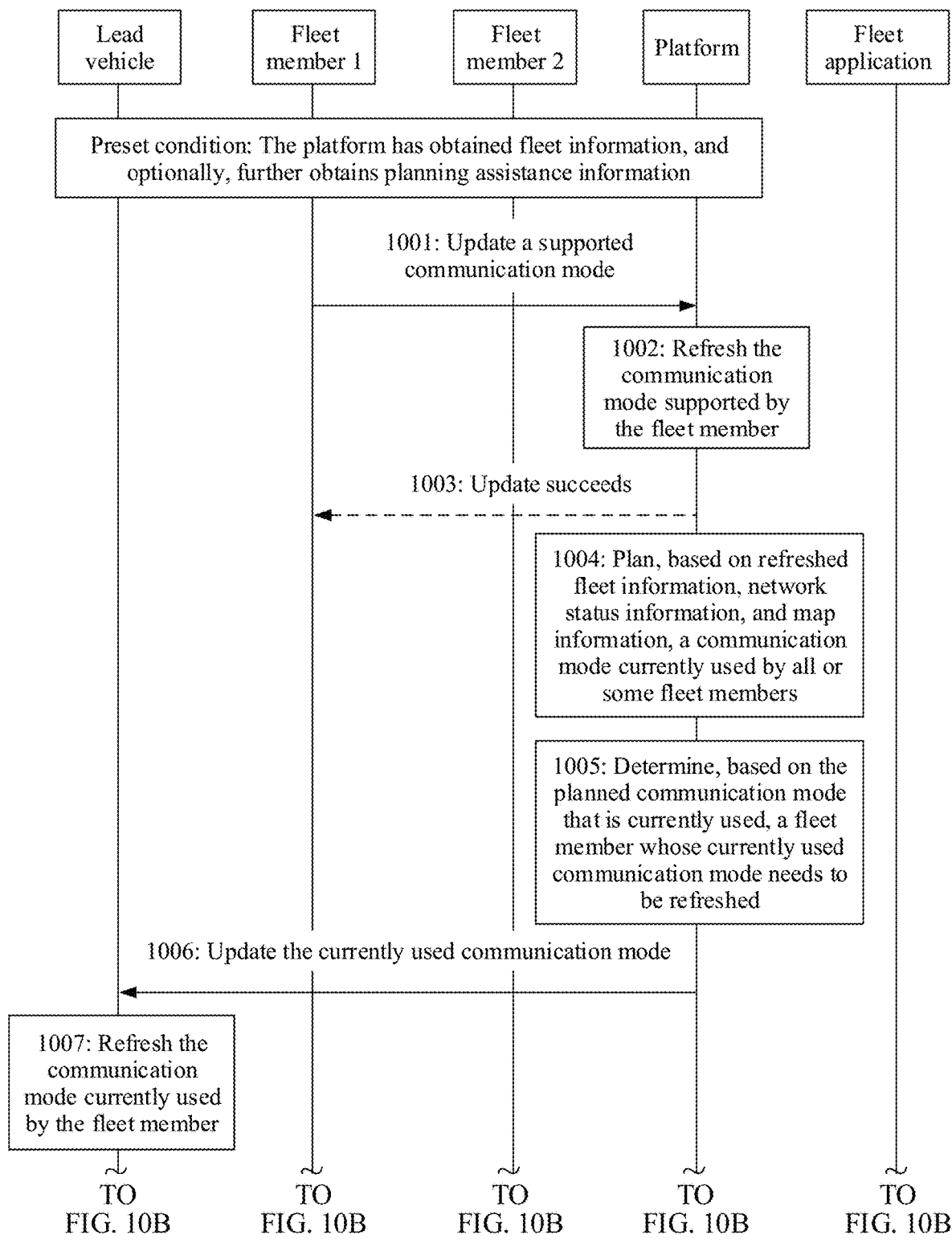
FIG. 10A and FIG. 10B are a flowchart of a method for planning a communication mode currently used by a fleet member according to an embodiment.
Figure 10B:
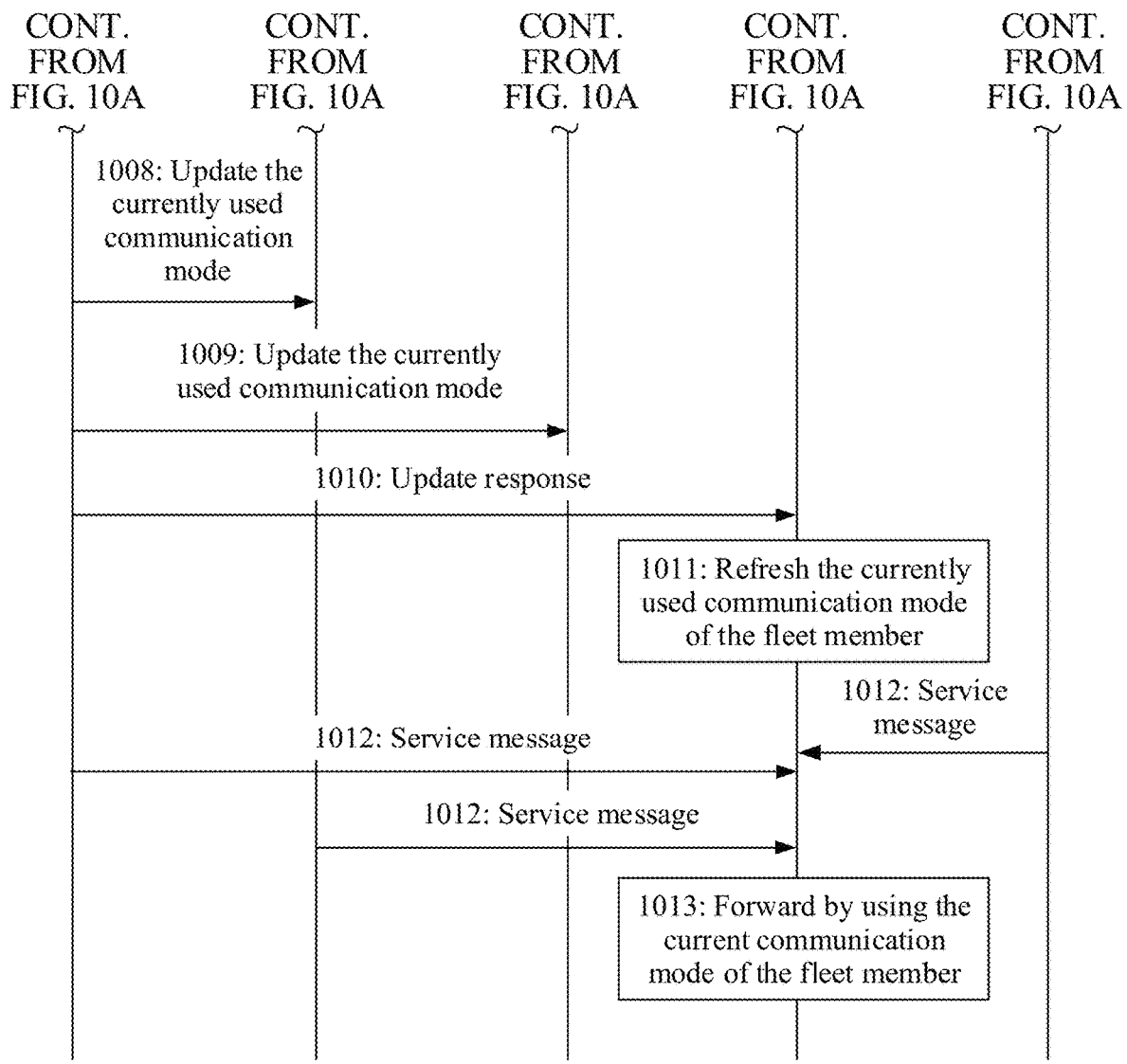

FIG. 10A and FIG. 10B show a further detailed process in the scenario 4013 in FIG. 4. To be specific, a change of the communication mode supported by the fleet member triggers the platform to plan the communication mode of the fleet or the fleet member. It should be noted that, before the method process shown in FIG. 10A and FIG. 10B, it is assumed that the platform has obtained the fleet information, and optionally, further obtains the planning assistance information. For a specific method for obtaining the fleet information and the planning assistance information by the platform, refer to information such as step 501, step 502, and step 503 shown in FIG. 5A. Details are not described herein again.

1001: The fleet member detects that a network status of the currently used communication mode is abnormal, refreshes information about the communication mode supported by the UE, and sends communication mode change information to the platform, where the communication mode change information includes the ID of the fleet member and the communication mode supported by the fleet member. For example, a fleet member 1 supports three communication modes: the PC5, the Uu, and the MBMS. Currently, the PC5 communication mode is used for communication. During traveling, the fleet member 1 detects a PC5 communication quality. When the communication quality is poor (for example, PC5 communication is blocked due to insertion of another vehicle outside the fleet), the fleet member 1 sets a PC5 communication capability to be unavailable, and refreshes the supported communication modes to the Uu and the MBMS. The fleet member 1 needs to send update information to the platform to update the supported communication modes, where the update information includes an ID of the fleet member 1 and the supported communication modes (the Uu and the MBMS). It should be noted that the fleet member 1 may send the update message to the platform by using the Uu communication mode, or may send the update message to the lead vehicle, and the lead vehicle forwards the update message to the platform.

1002: The platform refreshes a recorded communication mode supported by the fleet member, in other words, refreshes the fleet information.

1003: Optionally, the platform sends a response message to the fleet member whose supported communication mode is refreshed, to indicate that the update succeeds. It should be noted that the platform sends the message in step 1003 through a communication path that is the same as a communication path for sending the message in step 1001. For example, if the fleet member sends the message in step 1001 to the platform through the Uu interface, the platform sends the message in step 1003 to the fleet member by using the Uu communication mode. For example, if the fleet member sends the message in step 1001 to the platform through the lead vehicle, the platform forwards the message in step 1003 to the fleet member through the lead vehicle.

1004: The platform determines, based on the communication mode supported by the fleet member and the communication mode currently used by the fleet member, and with reference to a communication mode supported by an area in which the fleet currently travels, whether the communication mode currently used by the fleet member needs to be updated. If the communication mode does not need to be changed, the process ends. If the communication mode needs to be changed, the platform plans, based on the updated fleet information, the network status information, and the map information, a communication mode currently used by all or some of the fleet members in the fleet. It is assumed that the fleet member 1 refreshes the supported communication modes to the Uu and the MBMS, the platform determines that the current traveling area of the fleet supports the Uu, the MBMS, and the PC5, all the fleet members in the fleet support the Uu communication mode, and a communication mode currently used by most fleet members is the Uu. In this case, considering communication efficiency, the platform plans that the communication mode currently used by all the fleet members in the fleet is the MBMS (efficiency of broadcast is higher than efficiency of unicast). It should be noted that, in the method provided, it is assumed that the platform can obtain current traveling location information of the fleet at any time. How the platform obtains the location information of the fleet does not fall within the protection scope of this disclosure, and details are not described herein.

1005: The platform determines, with reference to the communication mode currently used by the fleet member and the communication mode that is currently used by the fleet member and that is planned by the platform in step 1004, a fleet member that needs to be notified to update a currently used communication mode. It is assumed that communication modes currently used by the fleet member 1 and a fleet member 2 are inconsistent with the communication mode planned by the platform. In this case, the platform needs to indicate the fleet member 1 and the fleet member 2 to update the currently used communication modes.

1006: The platform indicates the fleet member 1 and the fleet member 2 to update the currently used communication modes, where an update message includes an ID of the fleet member and the communication mode currently used by the fleet member. There may be one or more fleet members whose currently-used communication modes need to be updated. The platform may directly send the update message to the fleet member that needs to be updated, or may uniformly send the message to the lead vehicle, and the lead vehicle forwards the message to the fleet member. In the embodiment shown in FIG. 10A and FIG. 10B, a solution in which the message is forwarded by the lead vehicle is used as an example for description.

1007 to 1009: After receiving the message sent in step 1006, the lead vehicle records an updated communication mode currently used by the fleet member, and indicates, based on the ID that is of the fleet member and that is carried in the message, the corresponding fleet member to adjust the currently used communication mode.

1010: After the currently used communication mode is updated, the lead vehicle notifies the platform that the update is completed. If the platform separately notifies the fleet member 1 and the fleet member 2 through the Uu interface in step 1006, the fleet member 1 and the fleet member 2 each send an update response message to the platform in step 1010.

1011: The platform receives an update response message sent by the fleet, and the platform refreshes a recorded communication mode currently used by the fleet member.

1012: The platform may subsequently receive a platoon service message sent by a platoon application or the fleet application, the lead vehicle, or the following vehicle, where the platoon service message includes the source ID, the destination ID, and the message payload.

1013: After receiving the message, the platform forwards the message in the fleet based on the communication mode currently used by the fleet member. For details about the forwarding manner, refer to the description of step 513.

If the method processes shown in FIG. 5A, FIG. 5B, and FIG. 9 are to plan, by the platform, a communication mode of the fleet on a future traveling route, the method process shown in FIG. 10A and FIG. 10B is to adjust, by the platform in time, the communication mode currently used by the fleet member. In the method process shown in FIG. 10A and FIG. 10B, a change of the communication mode of the fleet member triggers the platform to adjust communication modes of the fleet member and another vehicle in the fleet in time. Based on the communication mode planning and the global information, a communication mode of a single vehicle or communication modes of some vehicles is/are flexibly adjusted in time, and the communication mode currently used by the fleet member is optimized, to further improve communication efficiency of the fleet.

Based on the idea provided and with reference to a specific development implementation architecture, the method provided may further derive a plurality of flexible specific implementations. For example, the fleet information reported by the fleet to the platform in step 3013 or step 504 may be actually reported by a plurality of entities to the platform by using different messages. For example, the fleet members each report, to the platform, a respective supported communication mode and a respective currently used communication mode. A platoon management entity requests the platform to create a platoon, where a request message carries an ID of a platoon member, an ID of a lead vehicle, and traveling scope information of the fleet. In addition, the functions and the method processes of the platform may further be specifically performed by a V2X server.

The foregoing method may be implemented by using the oneM2M standard as a framework. On an architecture, a platform corresponds to an infrastructure node common services entity (IN-CSE) defined in the oneM2M standard. Different types of vehicles may correspond to a middle node (MN), an application service ode(ASN), or an application dedicated node(ADN) that are defined in the oneM2M standard based on service processing capabilities or configurations of the vehicles. For the foregoing concepts defined in the oneM2M standard, refer to the oneM2M standard specification "TS-0001_Functional Architecture", and details are not described herein again. Based on a oneM2M standard architecture, the platform manages a fleet or a platoon in a form of a group. Fleet members or platoon members are managed as group members. The group members first need to register with the platform before the group members are created as a group for management and maintenance. For example, based on the oneM2M standard architecture, the method process shown in FIG. 5A and FIG. 5B specifically evolves into a process shown in FIG. 11A, FIG. 11B, and FIG. 11C.

Figure 11A:
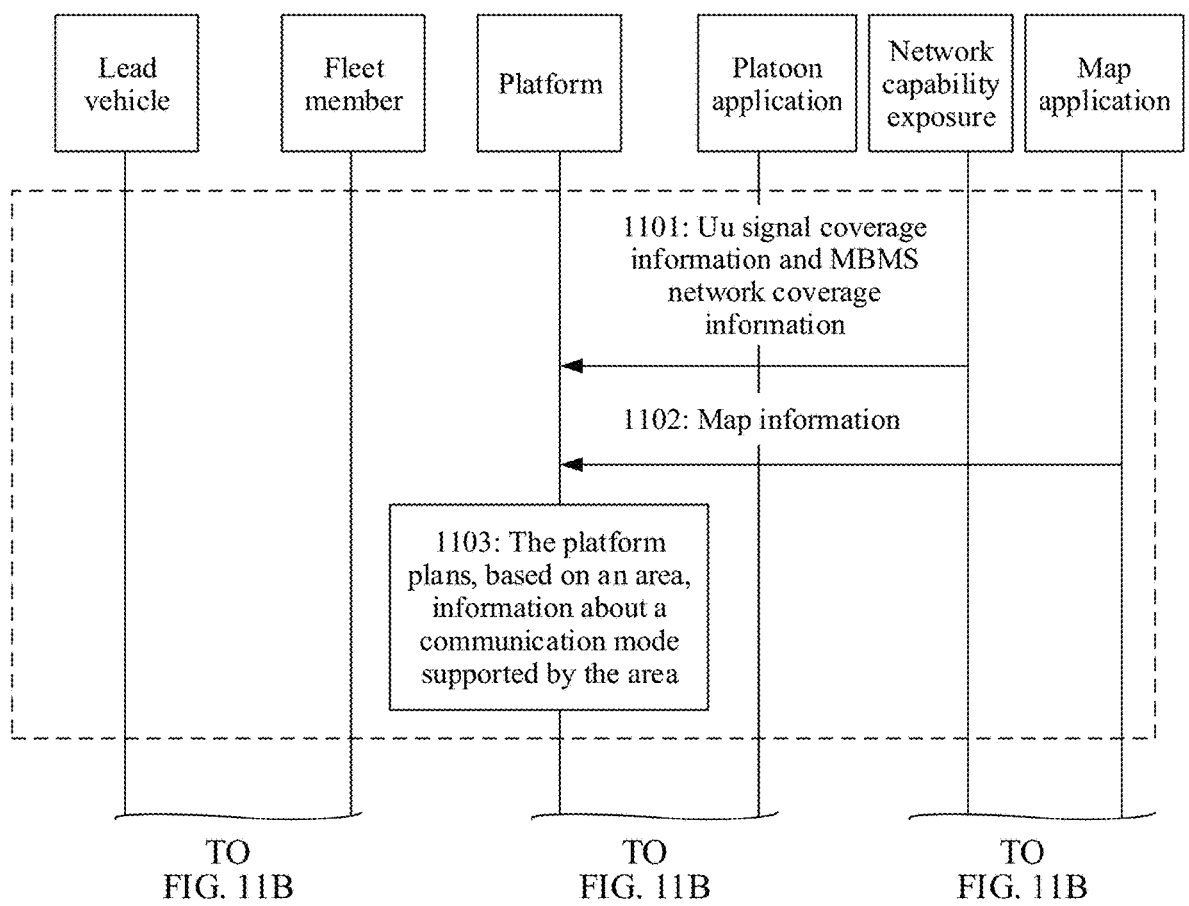
FIG. 11A, FIG. 11B, and FIG. 11C are a flowchart of another method for planning a communication mode of a fleet member according to an embodiment.
Figure 11B:
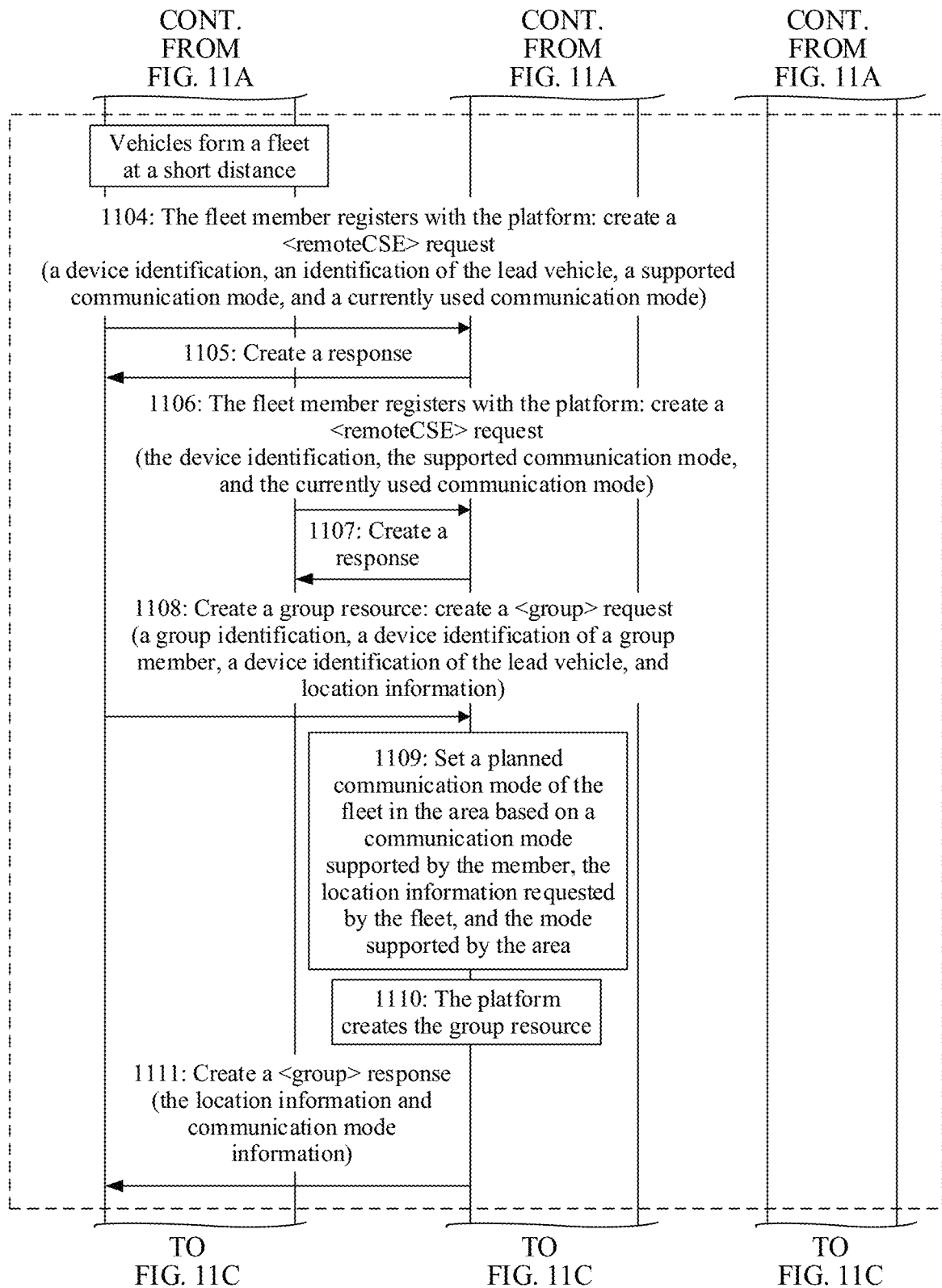
Figure 11C:
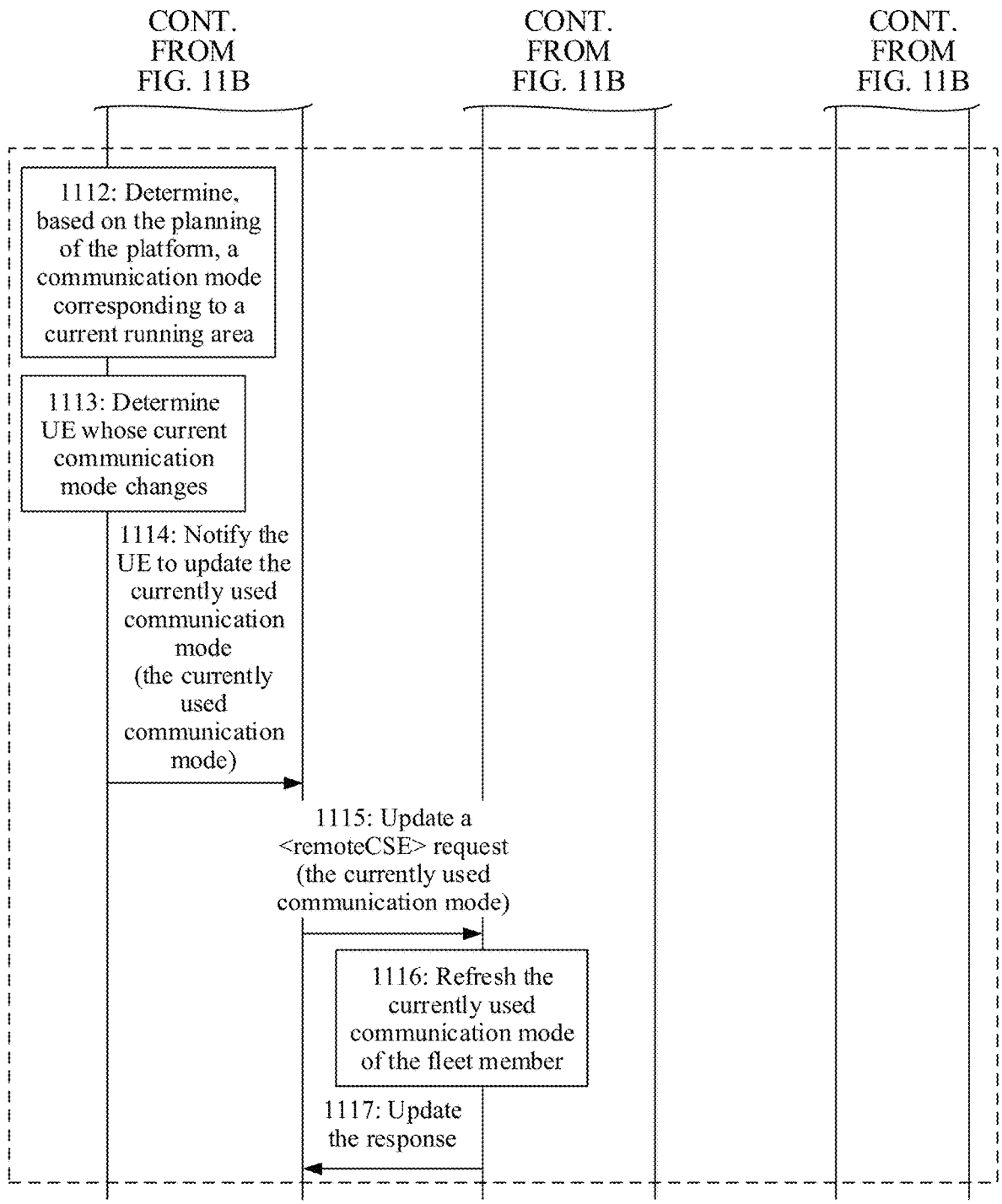

The process in FIG. 11A, FIG. 11B, and FIG. 11C is basically the same as the process in FIG. 5A and FIG. 5B. Step 1101 to step 1103 are specific implementations of step 501 to step 503. Step 1104 to step 1111 are specific implementations of step 504 to step 506. Step 1112 to step 1117 are specific implementations of step 507 to step 511. Different from FIG. 5A and FIG. 5B, each member in the fleet needs to perform device registration with the platform, and report a communication mode supported by the member and a currently used communication mode (as shown in step 1104 to step 1107). Then, a platoon management entity (for example, a lead vehicle or a service-providing server; in the figure, an example in which the lead vehicle requests the platform to create a platoon is used; and in step 1108, a message may alternatively be sent by another fleet management entity) requests the platform to create a group resource (for example, step 1108 to step 1111). In an implementation shown in FIG. 11A, FIG. 11B, and FIG. 11C, the platform records a communication capability (for example, the supported communication mode and the currently used communication mode) of each member in the fleet in a <remoteCSE>resource corresponding to the fleet member. Location information or traveling route information of the fleet, and a communication mode that is of the fleet and that is planned by the platform are recorded in a <group>resource created by the lead vehicle. In addition, when the communication mode currently used by the fleet member changes, the fleet member needs to initiate an update request to the platform, to request to update information recorded in the <remoteCSE>resource, as shown in step 1115 to step 1117.

The foregoing mainly describes the solutions provided in the embodiments from a perspective of interaction between network elements. It may be understood that, to implement the foregoing functions, each device or apparatus, for example, the vehicle or the fleet member, the platform, or the network element in the communications network, includes a corresponding hardware structure and/or software module for performing each function. For example, a corresponding communications apparatus should be integrated or built in a member of the fleet or the platoon, to implement the method procedure described in the foregoing embodiments. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of the present disclosure.

Figure 12:
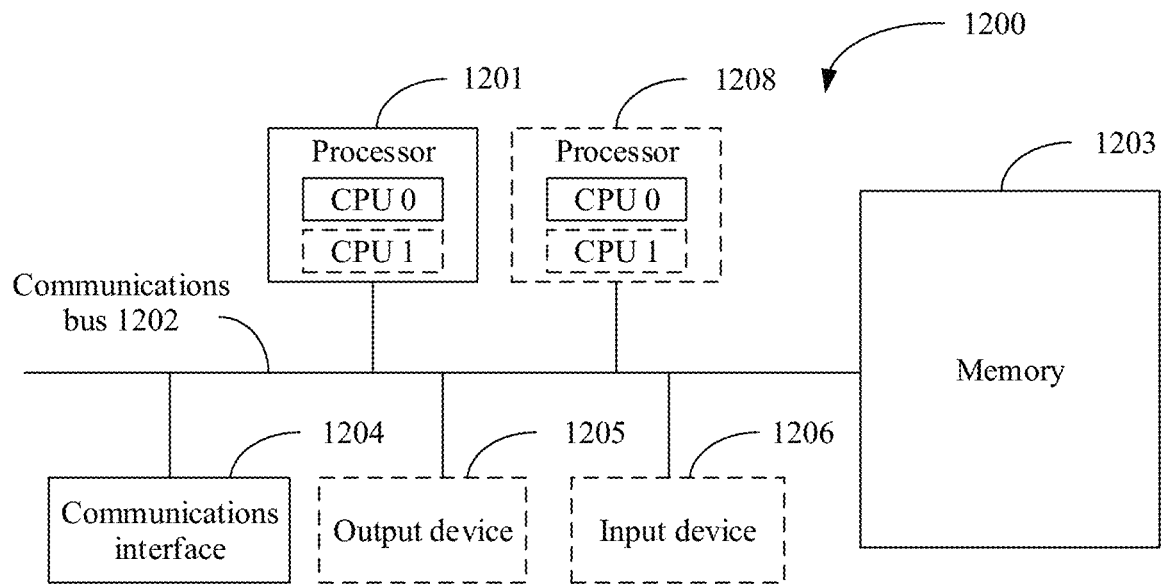
FIG. 12 is a schematic diagram of a structure of a computer apparatus according to an embodiment.

For example, as shown in FIG. 12, the platform, the communications apparatus integrated or built in the fleet member, or the network element in the communications network in the foregoing method embodiments may be implemented by using a computer device (or a system) in FIG. 12.

FIG. 12 is a schematic diagram of a computer device according to an embodiment. A computer device 1200 includes at least one processor 1201, a communications bus 1202, a memory 1203, and at least one communications interface 1204.

The processor 1201 may be a general-purpose central processing unit (CPU), a microprocessor, an application-specific integrated circuit (ASIC), or one or more integrated circuits for controlling program execution of the solutions.

The communications bus 1202 may include a path for transferring information between the foregoing components.

The communications interface 1204 uses any apparatus such as a transceiver, to communicate with another device or a communications network, for example, the Ethernet, a radio access network (RAN), or a wireless local area network (WLAN).

The memory 1203 may be a read-only memory (ROM) or another type of static storage device capable of storing static information and instructions, or a random-access memory (RAM) or another type of dynamic storage device capable of storing information and instructions, or may be an electrically erasable programmable ROM (EEPROM), a compact disc ROM (CD-ROM) or other compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing expected program code in a form of an instruction or a data structure and capable of being accessed by a computer. This is not limited thereto. The memory may exist independently, and be connected to the processor through the bus. The memory may alternatively be integrated with the processor.

The memory 1203 is configured to store application program code for performing the solution, and execution of the application program code is controlled by the processor 1201. The processor 1201 is configured to execute the application program code stored in the memory 1203, to implement a function in the method in this patent.

In a specific implementation, in an embodiment, the processor 1201 may include one or more CPUs, for example, a CPU 0 and a CPU 1 that are in FIG. 12.

In a specific implementation, in an embodiment, the computer device 200 may include a plurality of processors, for example, the processor 1201 and a processor 1208 that are in FIG. 12. Each of the processors may be a single-core (single-CPU) processor or a multi-core (multi-CPU) processor. The processor herein may refer to one or more devices, circuits, and/or processing cores configured to process data (for example, a computer program instruction).

In a specific implementation, in an embodiment, the computer device 1200 may further include an output device 1205 and an input device 1206. The output device 1205 communicates with the processor 1201, and may display information in a plurality of manners. For example, the output device 1205 may be a liquid-crystal display (LCD), a light-emitting diode (LED) display device, a cathode-ray tube (CRT) display device, or a projector. The input device 1206 communicates with the processor 1201 and may receive a user input in a plurality of manners. For example, the input device 206 may be a mouse, a keyboard, a touchscreen device, or a sensing device.

The computer device 1200 may be a desktop computer, a network server, a chip, a communications module, or a device or apparatus having a structure similar to the structure in FIG. 2. This embodiment does not limit a type of the computer device 1200. When the apparatus 1200 is a chip, a function/implementation process of the transceiver module 1204 may alternatively be implemented by a pin, a circuit, or the like. Optionally, the memory is a storage unit in the chip, for example, a register or a cache. The storage unit may alternatively be a storage unit located outside the chip.

Figure 13:
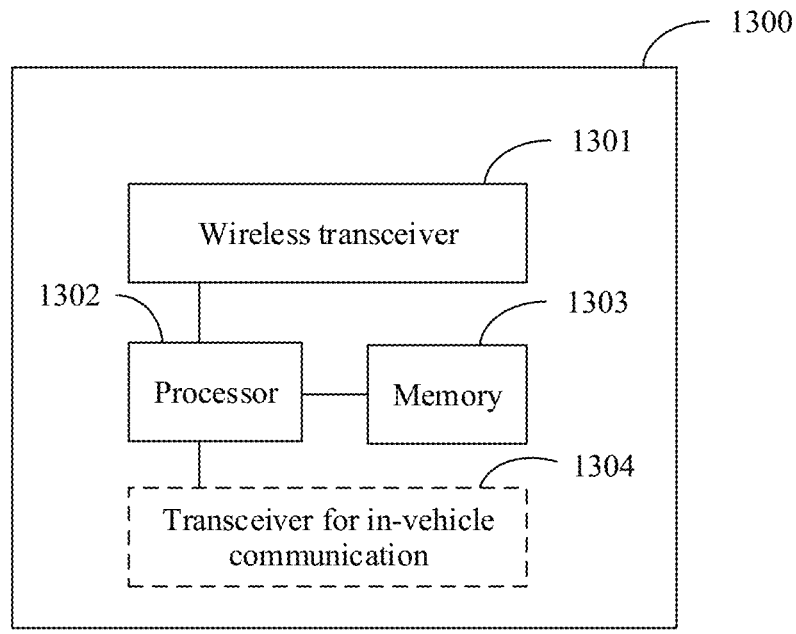
FIG. 13 is a schematic diagram of a structure of an in-vehicle apparatus according to an embodiment.

For example, as shown in FIG. 13, an apparatus shown in FIG. 13 may be integrated into the lead vehicle or another fleet member described in the foregoing method embodiments to implement the method provided in this patent.

An apparatus 1300 shown in FIG. 13 includes at least one wireless transceiver 1301, a processor 1302, and a memory 1303, and optionally, further includes a fleet communications transceiver.

The wireless transceiver 1301 is mainly configured to receive and send wireless signals, and communicate with a device or an apparatus (such as a base station, another vehicle, a roadside service unit, or a server) outside a vehicle. The wireless transceiver 1301 may support one or more wireless communications technologies, such as Wi-Fi, Uu communication, PC5 communication, MBMS communication, and LoRa. The wireless transceiver 1301 selects, according to an instruction of the processor, a corresponding communication mode to communicate with another apparatus or device.

The memory 1303 is configured to store vehicle-related information and fleet-related information. For example, the memory 1303 is configured to store an ID of the vehicle, a communication mode supported by the vehicle, and a communication mode currently used by the vehicle. Particularly, when the apparatus 1300 is an apparatus integrated in the lead vehicle, the memory 1303 is further configured to store an ID of a fleet member included in a fleet, a communication mode supported by each fleet member, and a communication mode currently used by each fleet member.

The processor 1302 may be a general-purpose CPU, a microprocessor, an ASIC, or one or more integrated circuits for controlling program execution of the solutions. The processor 1302 is mainly configured to: perform service processing, construct and parse messages, and communicate with an external device or apparatus through the wireless transceiver. For example, when the apparatus 1300 is the apparatus integrated in the lead vehicle, the processor 1302 is configured to construct fleet information to be sent to an IoT platform, and parse a communication mode that is of the fleet and that is planned by the platform and that is received by using the wireless transceiver 1301. In a traveling process of the fleet, based on a current location of the fleet and a communication mode that is of the fleet and that is sent by the IoT platform, the processor 1302 determines a communication mode that is planned by the IoT platform and that is supposed to be used by the fleet member of the fleet at the current location, determines a fleet member whose communication mode needs to be adjusted, and sends a message to the fleet member whose communication mode needs to be adjusted. The message is used to indicate the fleet member whose communication mode needs to be adjusted to adjust a currently used communication mode. When the communication mode supported by the fleet member changes, the processor 1302 is further configured to send a first message to the IoT platform. The first message includes an ID of the fleet member and the communication mode supported by the fleet member. The processor 1302 parses a notification message sent by the IoT platform, where the notification message includes a communication mode that is determined by the IoT platform and that is currently supposed to be used by the fleet member whose supported communication mode changes, and forwards the communication mode that is determined by the IoT platform and that is currently supposed to be used by the fleet member whose supported communication mode changes to the fleet member whose supported communication mode changes. When the communication mode currently used by the fleet member changes, the processor 1302 is further configured to send a second message to the IoT platform. The second message includes the ID of the fleet member and the communication mode currently used by the fleet member. For example, when the apparatus 1300 is an apparatus integrated into the another fleet member other than the lead vehicle, the processor 1302 is configured to send a registration request to the IoT platform, and the registration request includes an ID of the fleet member, a communication mode supported by the fleet member, and a communication mode currently used by the fleet member.

The fleet communications transceiver 1304 is configured to enable the apparatus 1300 to communicate with another apparatus or component in the vehicle.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a Digital Versatile Disc (DVD)), a semiconductor medium (for example, a solid-state drive (SSD)), or the like.

The objectives, technical solutions, and benefits of the present disclosure are described in the foregoing specific embodiments. The person of skill in the art should be understood that the foregoing descriptions are merely specific embodiments, but are not intended to limit the protection scope of the present disclosure. Any modification, equivalent replacement, or improvement made within the spirit and principle of the present disclosure shall fall within the protection scope of the present disclosure. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

What is claimed is:

1. A method implemented by an Internet of things (IoT) platform and comprising:
   receiving platoon information of a platoon, wherein the platoon comprises a plurality of platoon members, wherein the platoon information comprises member identifications (IDs) of the platoon members, a leader ID of a leader of the platoon, member communication modes supported by the platoon members, and platooning scope information of a platooning scope, and wherein the leader is one of the platoon members;
   obtaining a communication mode supported by a geographic area or a geographic scope based on network status information and map information, wherein the network status information comprises congestion information of a wireless signal, and wherein the map information comprises a building location relationship;
   planning a platoon communication mode based on the platoon information and planning assistance information, wherein the planning assistance information comprises the communication mode; and
   sending the platoon communication mode to the platoon members to instruct the platoon members to operate vehicles using the platoon communication mode in the platooning scope.

2. The method of claim 1, wherein the network status information further comprises coverage information of the wireless signal, and wherein the map information further comprises a road topology.

3. The method of claim 1, further comprising further receiving the platoon information from a platoon management entity.

4. The method of claim 1, wherein receiving the platoon information comprises receiving the member IDs and the member communication modes from the platoon members.

5. The method of claim 1, wherein receiving the platoon information comprises receiving, from a platoon management entity, a platoon creation request comprising the member IDs, the leader ID, and the platooning scope information.

6. The method of claim 5, wherein the platoon management entity is the leader or a service-providing server.

7. The method of claim 1, wherein the platoon information further comprises a current communication mode currently used by the platoon members.

8. The method of claim 1, wherein after sending the platoon communication mode, the method further comprises:
   receiving a first message for updating a first member communication mode supported by a first platoon member of the platoon members;
   updating, based on the first message, the platoon information to obtain updated platoon information;
   planning an updated platoon communication mode based on the updated platoon information; and
   sending, to the leader or the first platoon member, the updated platoon communication mode.

9. The method of claim 1, wherein after receiving the platoon information, the method further comprises receiving a second message to update the platoon communication mode.

10. The method of claim 1, further comprising:
    receiving a service message comprising a destination ID of the platoon or a first platoon member of the platoon members; and
    forwarding the service message to the first platoon member using a current communication mode of the first platoon member.

11. The method of claim 1, wherein the member communication modes are a Uu communication mode, a multimedia broadcast multicast service (MBMS) communication mode, a PC5 communication mode, or a dedicated short-range communications (DSRC) mode.

12. A method implemented by a leader of a platoon and comprising:
    sending, to an Internet of things (IoT) platform, platoon information comprising member identifications (IDs) of platoon members in the platoon, a leader ID of the leader, and platooning scope information of a platooning scope, wherein the leader is one of the platoon members;
    receiving, from the IoT platform, a platoon communication mode to instruct the platoon members to use the platoon communication mode in the platooning scope, wherein the platoon communication mode is based on the platoon information and planning assistance information, wherein the planning assistance information comprises a communication mode, wherein the communication mode is supported by a geographic area or a geographic scope based on network status information and map information, wherein the network status information comprises congestion information of a wireless signal, and wherein the map information comprises a building location relationship; and
    operating a vehicle using the platoon communication mode.

13. The method of claim 12, wherein after receiving the platoon communication mode, the method further comprises sending, to the IoT platform when a first member communication mode supported by a first platoon member of the platoon members changes, a first message comprising a first member ID of the first platoon member and comprising a current communication mode currently supported by the first platoon member.

14. The method of claim 13, wherein after sending the first message, the method further comprises:
    receiving, from the IoT platform, a message comprising an updated communication mode; and
    forwarding, to the first platoon member, the updated communication mode.

15. A method implemented by a first platoon member in a platoon, the method comprising:
    sending, to an Internet of things (IoT) platform, a first message to update a first supported member communication mode supported by the first platoon member;
    receiving, from the IoT platform and in response to the first message, an updated platoon communication mode, wherein the updated platoon communication mode is based on platoon information of the platoon and based on planning assistance information, wherein the planning assistance information comprises a communication mode, wherein the communication mode is supported by a geographic area or a geographic scope based on network status information and map information, wherein the network status information comprises congestion information of a wireless signal, and wherein the map information comprises a building location relationship; and operating a vehicle using the updated platoon communication mode.

16. The method of claim 15, wherein before sending the first message, the method further comprises sending, to the IoT platform, a first member ID of the first platoon member, the first supported member communication mode, and a current first communication mode currently of the first platoon member.

17. The method of claim 15, wherein after receiving the updated platoon communication mode, the method further comprises sending, to the IoT platform when the first supported member communication mode changes, a second message comprising a current first communication mode.

18. An Internet of things (IoT) platform comprising:
a memory configured to store instructions; and
one or more processors coupled to the memory and configured to execute the instructions to cause the IoT platform to:
  receive platoon information of a platoon, wherein the platoon comprises a plurality of platoon members, and wherein the platoon information comprises member identifications (IDs) of the platoon members, a leader ID of a leader of the platoon members, member communication modes supported by the platoon members, and platooning scope information of a platooning scope;
  obtain a communication mode supported by a geographic area or a geographic scope based on network status information and map information, wherein the network status information comprises congestion information of a wireless signal, and wherein the map information comprises a building location relationship;
  plan a platoon communication mode based on the platoon information and planning assistance information, wherein the planning assistance information comprises the communication mode; and
  send the platoon communication mode to the platoon members to instruct the platoon members to operating vehicles using the platoon communication mode in the platooning scope.

19. A leader of a platoon and comprising:
a memory configured to store instructions; and
one or more processors coupled to the memory and configured to execute the instructions to cause the leader to:
  send, to an Internet of things (IoT) platform, platoon information comprising member identifications (IDs) of platoon members in the platoon, a leader ID of the leader, and platooning scope information of a platooning scope, wherein the leader is one of the platoon members;
  receive, from the IoT platform, a platoon communication mode to instruct the platoon members to use the platoon communication mode in the platooning scope, wherein the platoon communication mode is based on the platoon information and planning assistance information, wherein the planning assistance information comprises a communication mode, wherein the communication mode is supported by a geographic area or a geographic scope based on network status information and map information, wherein the network status information comprises congestion information of a wireless signal, and wherein the map information comprises a building location relationship; and
  operate a vehicle using the platoon communication mode.

20. The IoT platform of claim 18, wherein the network status information further comprises coverage information of the wireless signal, and wherein the map information further comprises a road topology.

* * * * *

UNITED STATES PATENT AND TRADEMARK OFFICE
CERTIFICATE OF CORRECTION

| | | |
|---|---|---|
| PATENT NO. | : 12,033,513 B2 | Page 1 of 1 |
| APPLICATION NO. | : 17/141446 | |
| DATED | : July 9, 2024 | |
| INVENTOR(S) | : Can Zhao and Bei Xu | |

It is certified that error appears in the above-identified patent and that said Letters Patent is hereby corrected as shown below:

On the Title Page

Item [57], should read "In an IoT platoon communication method, an IoT platform plans and manages a communication mode of a platoon in a traveling process. In the traveling process, the platoon selects, based on a communication mode plan sent by the platform, a communication mode corresponding to a current location of the platoon for communication."

Signed and Sealed this
Third Day of September, 2024

Katherine Kelly Vidal
*Director of the United States Patent and Trademark Office*